(12) United States Patent
Sunol et al.

(10) Patent No.: US 9,976,068 B2
(45) Date of Patent: *May 22, 2018

(54) METHOD OF MODULATED EXOTHERMIC CHEMICAL SYSTEMS THROUGH PHASE CHANGE MATERIALS

(71) Applicants: Sermin G. Sunol, Lutz, FL (US); Aydin K. Sunol, Lutz, FL (US)

(72) Inventors: Sermin G. Sunol, Lutz, FL (US); Aydin K. Sunol, Lutz, FL (US)

(73) Assignee: University of South Florida, Tampa, FL (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/197,781

(22) Filed: Jun. 30, 2016

(65) Prior Publication Data

US 2016/0340566 A1 Nov. 24, 2016

Related U.S. Application Data

(63) Continuation of application No. 13/716,915, filed on Dec. 17, 2012, now Pat. No. 9,481,821, which is a continuation of application No. PCT/US2011/040524, filed on Jun. 15, 2011.

(60) Provisional application No. 61/354,874, filed on Jun. 15, 2010.

(51) Int. Cl.
*C09K 5/06* (2006.01)
*C09K 5/18* (2006.01)

(52) U.S. Cl.
CPC .................. *C09K 5/18* (2013.01); *C09K 5/06* (2013.01); *C09K 5/063* (2013.01)

(58) Field of Classification Search
CPC ....................................................... C09K 5/06
See application file for complete search history.

(56) References Cited

U.S. PATENT DOCUMENTS

| | | | | | |
|---|---|---|---|---|---|
| 4,741,324 | A | * | 5/1988 | Ina | B65D 81/3484 126/263.06 |
| 5,984,953 | A | * | 11/1999 | Sabin | A61F 7/03 607/108 |
| 6,644,383 | B2 | * | 11/2003 | Joseph | B65D 81/3484 126/263.01 |

FOREIGN PATENT DOCUMENTS

| | | | | | |
|---|---|---|---|---|---|
| GB | 669782 | A | * | 4/1952 | A61K 9/209 |
| JP | 60163837 | A | * | 8/1985 | |
| WO | WO-2007087039 | A2 | * | 8/2007 | C09K 5/18 |

OTHER PUBLICATIONS

English abstract of Aizawa et al. JP 60-163837A (1985).*

* cited by examiner

*Primary Examiner* — Peter F Godenschwager
(74) *Attorney, Agent, or Firm* — Nilay J. Choksi; Robert J. Varkonyi; Smith & Hopen, P.A.

(57) ABSTRACT

The chemical reactions modulation of temperature and dissipate heat through using phase change materials (PCM). Hydration of a mixture composed of encapsulated and/or non-encapsulated oxides such as calcium oxide and/or magnesium oxide and dehydrated and/or hydrated zeolite coupled with control of pH of mixture through compounds such as Citric acid, or combination exothermic mixes, such as Cao and Mg—Fe, provide sustained heat release and heat retention tailored by addition of PCMs. The modulation may include timed/controlled release from encapsulated reactants and may include particles with tailored size distribution and different burn characteristics. The phase change materials used include organics (paraffins, non paraffins and fatty acids) and inorganics (salt hydrates). The selection of PCM is based on compatibility with the reacting mix, added reacting aqueous medium, and the desired temperature the system is to be held constant or temperature range it is desired to be modulated.

20 Claims, 25 Drawing Sheets

*fluffy = polyester blanket filling from store

METHOD OF MODULATED EXOTHERMIC CHEMICAL SYSTEMS THROUGH PHASE CHANGE MATERIALS

CROSS REFERENCE TO RELATED APPLICATIONS

This application is a continuation of U.S. Nonprovisional application Ser. No. 13/716,915, entitled, "A Method of Modulated Exothermic Chemical Systems Through Phase Change Materials", filed Dec. 17, 2012, which claims priority to International Patent Application No. PCT/US2011/040524, entitled "A Method of Modulated Exothermic Chemical Systems Through Phase Change Materials," filed on Jun. 15, 2011 which is a non-provisional of and claims priority to U.S. Provisional Appl. No. 61/354,874, entitled, "Method of Sustained Modulation of Temperature in Self-Heating Chemical System through Combined Chemical Reactions and Phase Change Materials", filed Jun. 15, 2010, the contents of which are herein incorporated by reference.

FIELD OF INVENTION

This invention relates to temperature modulation. Specifically, the invention provides a novel method of modulating the temperature of products by generating a sustained exothermic reaction via reactant interaction and phase changes in reactants.

BACKGROUND OF THE INVENTION

Many self-heating products are emerging in the marketplace. The applications include products for food, beverages, and hand warmers. There are many areas such as disposable wipes where an unmet need exists is in the application of the technology. These applications, as well as others, require self-heating through the reaction of chemicals. The initiation and control of these reactions, retention and distribution of heat, and handling of materials are key issues. These issues are only partially handled for various products in the market. One key area not addressed in the market is a sustained modulation of heat.

In the initiation of these heating reactions, control of these reactions, retention and distribution of heat, and handling of materials are key issues that are partially handled for various products in the market. The temperature peak for a heating system is typically not to reach above 100° C., so that steam is not generated and pressures within the heating container do not increase significantly.

Many self-heating cans have dual chambers; an inner chamber that holds food or drink and the outer chamber houses chemicals that undergo the exothermic reaction. For example, a self-heating coffee marketed under the Wolfgang Puck name, was recently manufactured. The self-heating cans were activated by pushing a plastic button on the bottom, allowing water to flow into a sealed inner cone filled with quicklime, which is mostly calcium oxide, and heating the coffee to 145° F. in six to eight minutes. When the user wants to heat the contents of the can, they pull a ring on the can that breaks the barrier separating the chemicals in the outer chamber. After the heat from the reaction has been absorbed by the food, the user can enjoy a hot meal or drink. (Kim Severson, Taking the Heat Out of the Kitchen, The NY Times, May 11, 2005). However, the technology is not yet common, largely due to the expense of the cans and problems with uneven heating of their contents. The Wolfgang Puck coffee was recalled due to complaints that the cans were too hot or cold, or that they otherwise malfunctioned. (Kim Severson & Melanie Warner, Self-Heating Latte Cans Bring Out Lawyers, The NY Times, May 2, 2006). There were allegations that the cans overheated, spurted product from the can, meltdowns, curdled product, and exploded.

As such, there exists an unmet need in the art to generate controlled and/or modulated exothermic reactions.

SUMMARY OF THE INVENTION

This invention provides a method to modulate chemical reactions that allow tuning of substrate temperature profiles through sequestering of several exothermic reactions, regulation of reaction, heat and mass transfer rates, and control of the reaction initiation. This invention combines modulation of chemical reactions, thereby allowing tuning of substrate temperature profiles through sequestering of several exothermic reactions, regulation of reaction, heat and mass transfer rates, and control of the reaction initiation with melting the phase change materials with the heat provided through the chemical reaction and subsequently, utilizing the heat released during fusion of the phase change material. The present invention broadens the applicability of the chemical used in self-heating products to extend the release of heat, particularly useful in food and beverages, through providing extended release without the need for encapsulation. The invention addresses these issues with an inexpensive, simple, safe, and environmentally-friendly solution.

The exothermic reactants comprise at least a solid reactant, where the reactant is one or more metal oxides, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, aluminum alloy, magnesium-iron, and combinations thereof. Exemplary metal oxides include calcium oxide, barium oxide, strontium oxide, sodium oxide, potassium oxide, magnesium oxide, lithium oxide, and combinations thereof. The reactant may optionally be added as a powder, granular, and prilled form. The exothermic reactants may also include a solid reactant modulator, such as zeolite, mineral chabazite, M41S type material, zeolite-like mesoporous material, or other porous exothermic reactant. The invention also provides at least one phase change material. The exothermic mix includes at least one phase change material, which provides modulated heat generation. The phase change materials have melting points between about 30 and about 60° C., and include organics (paraffins ($C_nH_{2n+2}$), non paraffins and fatty acids ($CH_3(CH_2)_{2n}COOH$)) and inorganics (salt hydrates ($M_nH_2O$)). Exemplary phase change materials include paraffins, non paraffins, fatty acids, and salt hydrates, PCMS include paraffinic hydrocarbons, such as eicosane; and plastic crystals, such as 2,2-dimethyl-1,3-propanediol (DMP) and 2-hydroxymethyl-2-methyl-1,3-propanediol (DMP), other phase change materials described in Bryant, et al. (U.S. Pat. No. 5,499,460), paraffinic compounds described in Table 1, inorganic salt hydrates, like sodium sulfate decahydrate, calcium chloride hexahydrate, lithium nitrate trihydrate, zinc nitrate hexahydrate, strontium chloride hexahydrate, and polyethylene glycol, plastic crystals, like pentaerythritol, as described by Vigo, et al. (U.S. Pat. No. 4,871,615), lauric acid, myrastic acid, trimethylolethane, pentaerythritol, 2-amino-2-methyl-1,3-propanediol, and 2-hydroxymethyl-2-methyl-1,3-propanediol. In specific embodiments, the phase change materials have metling points between 30-60° C. Typical ratios for PCMs to reacting mixes is about maximum 4 (PCM) to 1 CaO. However, these ratios are adjusted for different mixes, such that the reaction is sufficient to melt the PCM. Regardless of the exothermic reactant mix, the ratios reach a maximum of 10 for Mg—Fe/AL alloys.

TABLE 1

Listing of paraffinic hydrocarbon phase change materials, with the associated number of carbons and the metling point.

| Compound name | Number of carbon atoms | Melting point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |

Without being bounds by any theories, the phase change permits modulation of heat dissipation through combining the heat release through chemical reaction with heat released during fusion of phase change materials. In the former, the amount of heat released is excess for small systems. The initial heat released during reaction is utilized for immediate initial heating of the system and then to melt the phase change material that it placed adjacent to the pouch where the chemical reaction takes place. Subsequently, the phase change material solidifies at a constant temperature providing heat for prolonged durations. The selection of PCM is based on compatibility with the reacting mix, added reacting aqueous medium, and the desired temperature the system is to be held constant or temperature range it is desired to be modulated.

The solid reactants are wetted by a liquid reaction mix of water and optionally at least one surfactant. Exemplary surfactants include ammonium lauryl sulfate, sodium dodecyl sulfate, sodium myreth sulfate, dioctyl sodium sulfosuccinate, perfluorooctanesulfonate, perfluorobutanesulfonate, alkyl benzene sulfonate, alkyl aryl ether phosphate, alkyl ether phosphate, sodium stearate, Sodium lauroyl sarcosinate, perfluorononanoate, perfluorooctanoate, octenidine dihydrochloride, alkyltrimethylammonium salt, cetyl trimethylammonium bromide, cetyl trimethylammonium chloride, cetylpyridinium chloride, polyethoxylated tallow amine, benzalkonium chloride, benzethonium chloride, 5-bromo-5-nitro-1,3-dioxane, dimethyldioctadecylammonium chloride, dioctadecyldimethylammonium bromide, 3-[(3-Cholamidopropyl)dimethylammonio]-1-propanesulfonate, cocamidopropyl hydroxysultaine, cetyl alcohol, stearyl alcohol, cetostearyl alcohol, oleyl alcohol, polyoxyethylene glycol alkyl ethers, octaethylene glycol monododecyl ether, pentaethylene glycol monododecyl ether; polyoxypropylene glycol alkyl ether; decyl glucoside, lauryl glucoside, octyl glucoside; Triton X-100, polyoxyethylene glycol alkylphenol ether nonoxynol-9, glyceryl laurate, nonyl phenoxypolyethoxylethanol, sorbitan alkyl ester, cocamide MEA, cocamide DEA; dodecyldimethylamine oxide, mono-ethylene glycol, block copolymers of polyethylene glycol, block copolymers of polypropylene glycol, triethanolamine, or combinations thereof. Where a surfactant is added to the exothermic reactant mix, a ratio of water-to-surfactant over 1 has been found especially useful. Also, in the case of high polymer weight polymers, the composition provides extended heat release due to phase change. As such the self-heating chemical system uses one or more primary solid reactants for exothermic reactions, such as calcium oxide, and one or more porous solid components, like zeolite, that can serve as a heat sink and conductor of heat as well as under going chemical transformations that release heat.

Optionally, one or more pH modulators, such as weak acids or acid salts, are added for sustained modulation of temperature and pH. Some exemplary weak acids are citric acid, tartaric acid, oxalic acid, orthophosphoric acid, and sulfamic acid; and exemplary acid salts sodium hydrogen sulfate and potassium hydrogen sulfate. The rate of heat generation coupled with mass and energy transfer rates to or from system(s) allows modulation of the temperature of systems. The modulation can be further enhanced by controlled release and availability of some of the components. As such, the reactants may be encapsulated in a coating of the pH modulator, limiting initial wetting of the exothermic reactants. In certain embodiments, oxides, such as calcium oxide and/or magnesium oxide are encapsulated, and dehydrated zeolite may also be encapsulated in other embodiments. This method provides with a class of self-heating product applications and focuses on the modulation of temperature through sequestering of reactions with different rates, heat release through dissolution, heat release through mixing, heat release through sorption, heat release through phase change as well as controlling mass and heat transfer rates. The modulation may include timed/controlled release from encapsulated reactants and may include particles with tailored size distribution and different burn characteristics.

One embodiment of the invention also provides a self heating package having temperature changing element. The temperature changing element comprises a solid reactant containment chamber disposed on the wall of the outer wall, a liquid reactant containment chamber disposed adjacent to the solid containment chamber, wherein the liquid containment chamber is in fluid communication with the lumen of the solid containment chamber, a rupturable barrier disposed between the solid reactant containment chamber and the liquid reactant containment chamber, wherein the rupturable barrier is adapted to control flow of fluids between the solid reactant containment chamber and the liquid reactant containment chamber, and an item pocket disposed adjacent to the solid reactant containment chamber and the liquid reactant containment chamber. The containment membranes of the having temperature changing element are optionally composed of a moisture impermeable layer. Exemplary materials include metalized film, foil laminate film, and formed metal sheet. In some embodiments, the rupturable barrier between the solid reactant containment chamber and liquid reactant containment chamber is a frangible seal, or a weakened portion of the liquid containment membrane seal. The solid reactant containment chamber may be under vacuum to enhance the wetting of the solid reactants.

The temperature changing element uses an exothermic reaction to heat an item in the package. Useful compositions comprise a first solid reactant, a second solid reactant, and a liquid reaction mix. The first solid reactant may be a metal oxide, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, or combinations thereof. In specific embodiments, the metal oxide is calcium oxide, barium oxide, strontium oxide, sodium oxide, potassium oxide, magnesium oxide, lithium oxide, or combinations thereof.

The second solid reactant is zeolite or other porous exothermic reactant. The solid reactants are wetted by a liquid reaction mix of water and at least one surfactant. The invention provides modulation of heat generation and dissipation through incorporation of components such as glycerol and mono-ethylene glycol, and polyethylene glycol in the formation. Optionally, one or more weak acids or acid salts is added to the liquid reaction mix, if in liquid form, or to the solid reactants, for solid forms. Some exemplary weak acids are citric acid, tartaric acid, oxalic acid, orthophosphoric acid, and sulfamic acid; and exemplary acid salts sodium hydrogen sulfate and potassium hydrogen sulfate.

The solid reactants are disposed in the solid reactant chamber, such as fixing the reactants to the inner face of the solid reactant containment chamber, with the liquid reaction mix disposed in the liquid containment chamber.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
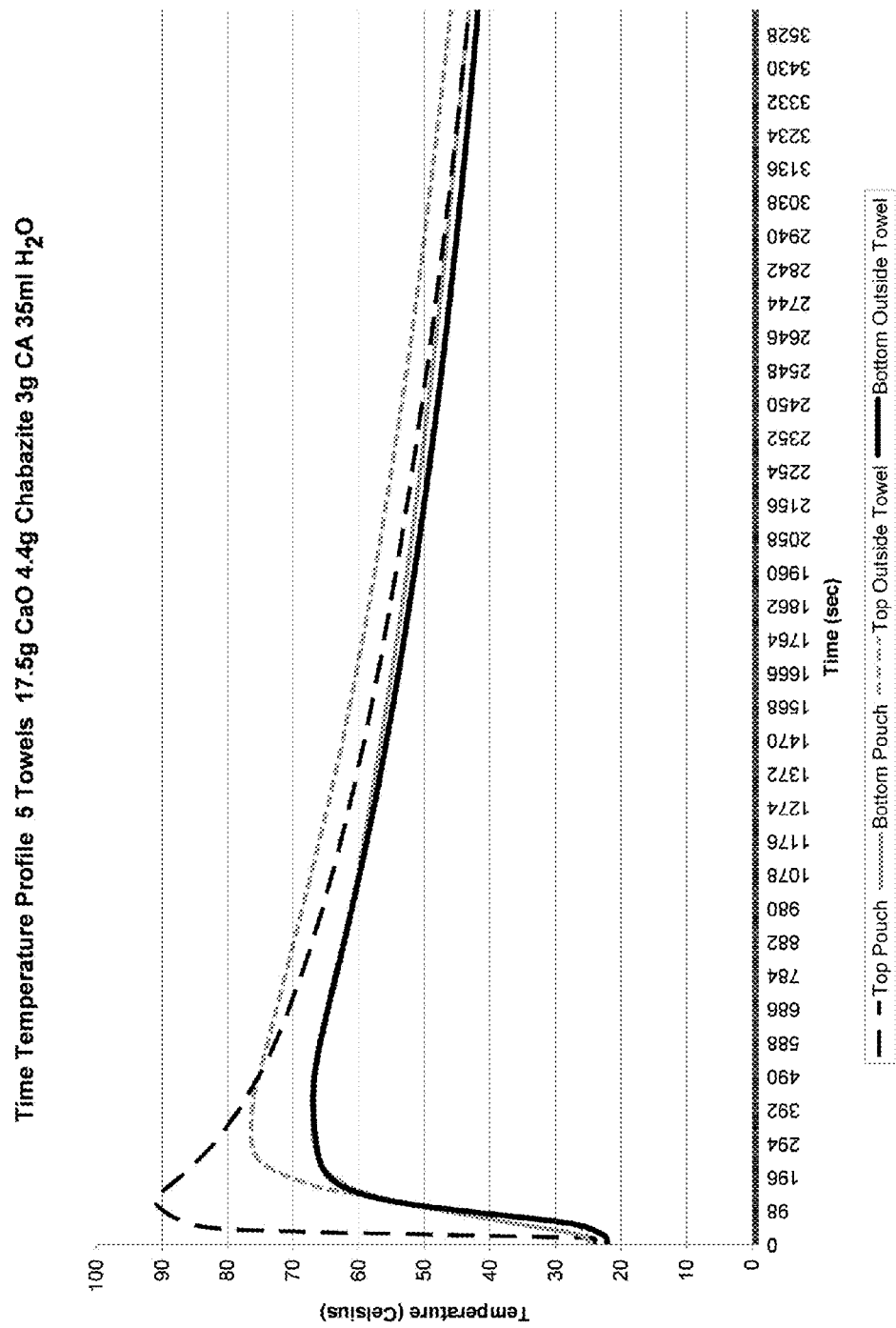
FIG. 1 is graph illustrating temperature profiles for a system using 5 towels and having a composition including 17.5 g. of CaO, 4.5 g. zeolite, 3 g. citric acid, and 35 ml. water. The graph illustrates the temperature at various points within the pouch system.

The present invention is a temperature changing package for heating an item or space with a modulated exothermic reaction upon activation. The disclosed method pertains to a class of self heating product applications and focus on the modulation of temperature through sequestering of reactions with different rates, heat as well as mass transfer rates controlling. This invention relates to a chemical mix that allows sequencing.

The present invention may be understood more readily by reference to the following detailed description of the preferred embodiments of the invention and the Examples included herein. However, before the present compounds, compositions, and methods are disclosed and described, it is to be understood that this invention is not limited to specific exothermic reactants, reaction modulators, phase-changing materials, pounch/containment materials, specific conditions, or specific methods, etc., as such may, of course, vary, and the numerous modifications and variations therein will be apparent to those skilled in the art. It is also to be understood that the terminology used herein is for the purpose of describing specific embodiments only and is not intended to be limiting.

As used herein, "activation" is a method or action taken to initiate an exothermic chemical reaction system. Activation may be characterized by the application of a linear force, torsional bending, removal of a separation, or combinations thereof.

As used herein, "surfactant" or "surfactants" are compounds that lower the surface tension of a liquid, the interfacial tension between two liquids, or that between a liquid and a solid, and are classified into four primary groups; anionic, cationic, non-ionic, and zwitterionic based on their charge Surfactants are usually organic compounds that are amphiphilic, having both hydrophobic and hydrophilic moieties that permit the surfactant molecule to interact with both a water insoluble (or oil soluble component) and a water soluble component.

In some embodiments, an integrated self-heating package is formed from a multiple layered structures. "Integrated", as used herein, means that a temperature changing element is part of the packaging rather than a separate unit located within the packaging.

The disclosed invention is a self-heating chemical system for sustained modulation of temperature. One or more primary components for exothermic reactions (such as calcium oxide), and one or more porous components that can serve as a heat sink and conductor of heat as well as under going chemical transformations that release heat (zeolite), are used to generate an exothermic chemical reaction. The temperature profiles generated by the exothermic reaction are sequesteried by combining the exothermic reactions with at least one phase change material. Exothermic reactions, mixing of some chemicals, sorption of certain chemicals, phase changes in chemicals, and dissolution of some chemicals in solvents release heat during these operations. The rate of heat generation coupled with mass and energy transfer rates to or from system(s) allows modulation of the temperature of systems. This invention relates to a mixture that allows sequencing.

The phase change materials (PCM) regulate the reaction and heat and mass transfer rates by storing excess heat and changing phase. For example, the phase change materials dissipate heat through combining the heat release through chemical reaction with heat released during fusion of phase change materials. With the heat provided by the exothermic reactants, the phase change material melts, reducing the amount of heat generated by the exothermic reactants. When the temperature is decreases to the melting temperature of the phase change material, the material solidifies again, releasing the heat that it absorbed during melting, thereby radiating as the temperature from the reaction drops. The result is fast heating to a moderate temperature and sustaining heat to keep the temperature constant for a prolonged duration. In some embodiments, the temperature changing element utilizes the heat from the combination of exothermic reactants to transfer modulated heat an object or material. The selection of PCM is based on compatibility with the reacting mix, added reacting aqueous medium, and the desired temperature the system is to be held constant or temperature range it is desired to be modulated. Phase change materials include organics (paraffins, non paraffins and fatty acids) and inorganics (salt hydrates), such as myristic acid and lauric acid.

The exothermic reactant mix comprises a first solid reactant, a second solid reactant, and a liquid reaction mix. The first solid reactant may be a metal oxide, such as calcium oxide, barium oxide, strontium oxide, sodium oxide, potassium oxide, magnesium oxide, and lithium oxide. Other first solid reactants include calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, or combinations thereof. In specific embodiments, the metal oxide is calcium oxide, barium oxide, strontium oxide, sodium oxide, potassium oxide, magnesium oxide, lithium oxide, or combinations of any of the first solid reactants. The solid materials can be in an anhydrous form and used as a powder, granular, and/or prilled form. The components are typically hydroscopic and readily dissolve or react with liquid reactants, such as water, to emit heat.

The second solid reactant is zeolite or other porous exothermic reactant, such as the zeolite Carbsorb 500, other mineral chabazite, M41S type materials, zeolite-like mesoporous materials described by Prins, et al. (Chima 2001, 55(10): 791-795), and other porous materials. The solid reactants are wetted by a liquid reaction mix of water and at least one surfactant. The invention provides modulation of heat generation and dissipation through incorporation of components such as glycerol and mono-ethylene glycol, and polyethylene glycol in the formation.

The exothermic reaction between CaO and water in the presence of Zeolite has a complex mechanism. There are at least two steps involved in the reaction mechanism. The first step is the wetting of CaO and Zeolite surfaces. Once the water is adsorbed on the surface and the surface is wetted, hydrolysis reaction between CaO and water starts, seen as the second peak in FIG. 1. This reaction occurs in rapid fashion, shown in FIG. 1, with most of the heat released within a maximum of 10-20 minutes. Part of the exothermic reaction in the present invention is the modulated release of heat. The calcium oxide and optional magnesium oxide provide strong exothermic reactions, releasing heat.

$$CaO + H_2O \rightarrow Ca(OH)_2 \quad \Delta H_r = -65.15 \text{ kJ/mol}$$

calcium oxide+water→calcium hydroxide $$Na_{16}(Al_{16}Si_{32}O_{96}) + 16H_2O \rightarrow Na_{16}(Al_{16}Si_{32}O_{96}) \cdot 16H_2O \quad \Delta H_r = -640 \text{ kJ/mol}$$

zeolite+water→hydrated zeolite $$CaO \cdot MgO + H_2O \rightarrow Ca(OH)_2 + MgO$$

$$MgO + H_2O \rightarrow Mg(OH)_2 \quad \Delta H_r = -37.1 \text{ kJ/mol}$$

Figure 2:
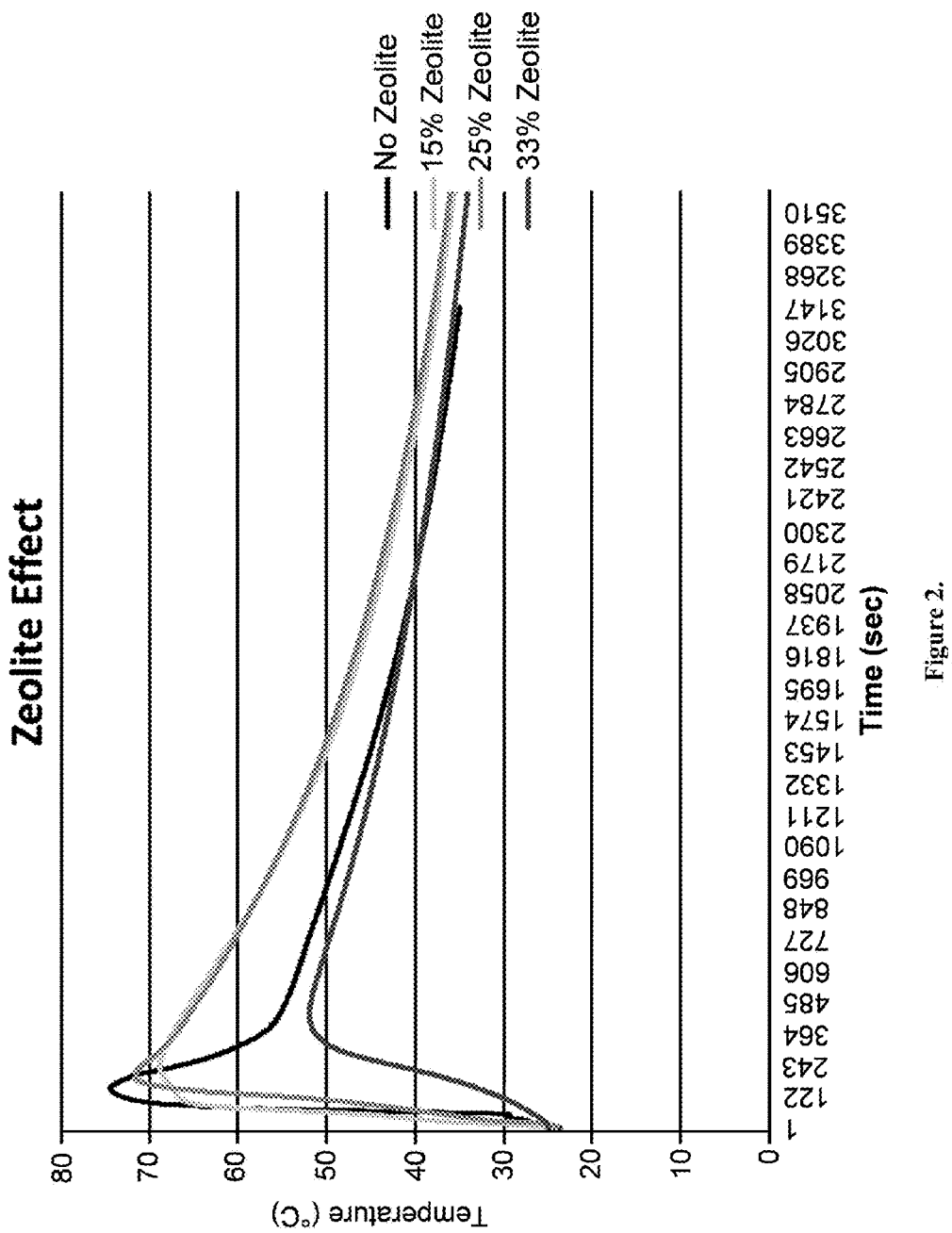
FIG. 2 is a graph showing the effect of zeolite at differing concentrations on the heat generation profiles of the exothermic reaction using CaO and optionally MgO.
Figure 3:
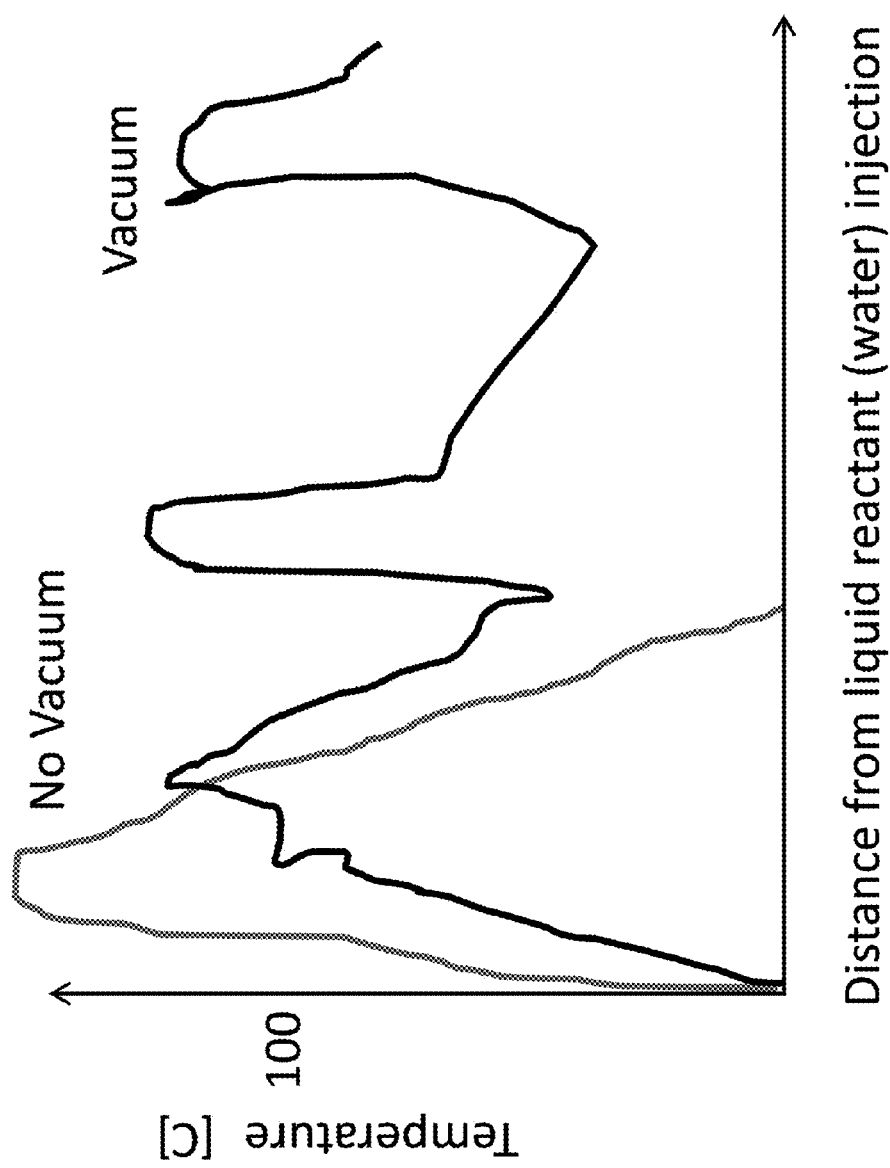
FIG. 3 is a graph showing the effect of vacuum on the heat generation profiles of the exothermic reactions where zeolite was not added. The vacuum was prepared by subjecting the reactant pouch to 400 mm mercury negative pressure for 8 seconds.

Zeolite is considerably less exothermic than the first solid reactants, such as calcium oxide and magnesium oxide, and may act as a heat sink during the initial exothermic reaction. The addition of zeolite to calcium oxide prevents the exothermic reaction from exceeding 100° C. and maintains a more consistent and steady temperature over time, seen in FIG. 2. The effect of the zeolite is not simply from an exothermic reaction, but that the zeolite absorbs heat from the calcium oxide during the initial exothermic reaction, and releases the absorbed heat as the exothermic reaction comes to completion. This allows the reaction to quickly heat, due to the CaO, but obtain an effective, long-term exothermic reaction, as the zeolite stores heat and conducts the heat uniformly. This also prevents excess hot spots and allows the zeolite to "hold" the heat to provide sustained heat transfer. It is noted that the amount of zeolite has an impact on this modulation effect, as too much zeolite over-modulates the exothermic reaction, preventing the temperatures from reaching above 55° C., as seen in FIG. 3.

Figure 4:
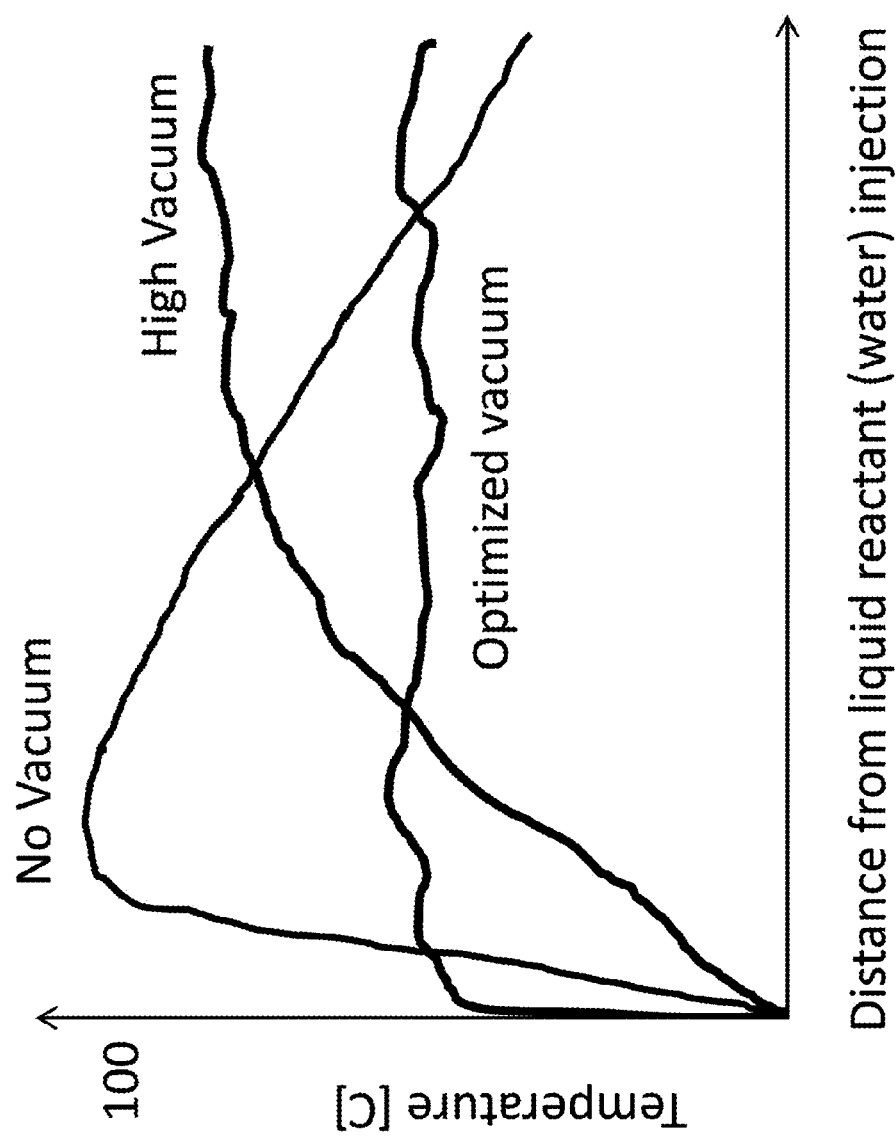
FIG. 4 is a graph showing the effect of vacuum on the heat generation profiles of the exothermic reactions, with zeolite added. The slight (some) vacuum was prepared by subjecting the reactant pouch to 400 mm mercury negative pressure for 4 seconds while high vacuum (vacuum) was subjected to 400 mm mercury negative pressure for 8 seconds.
Figure 5:
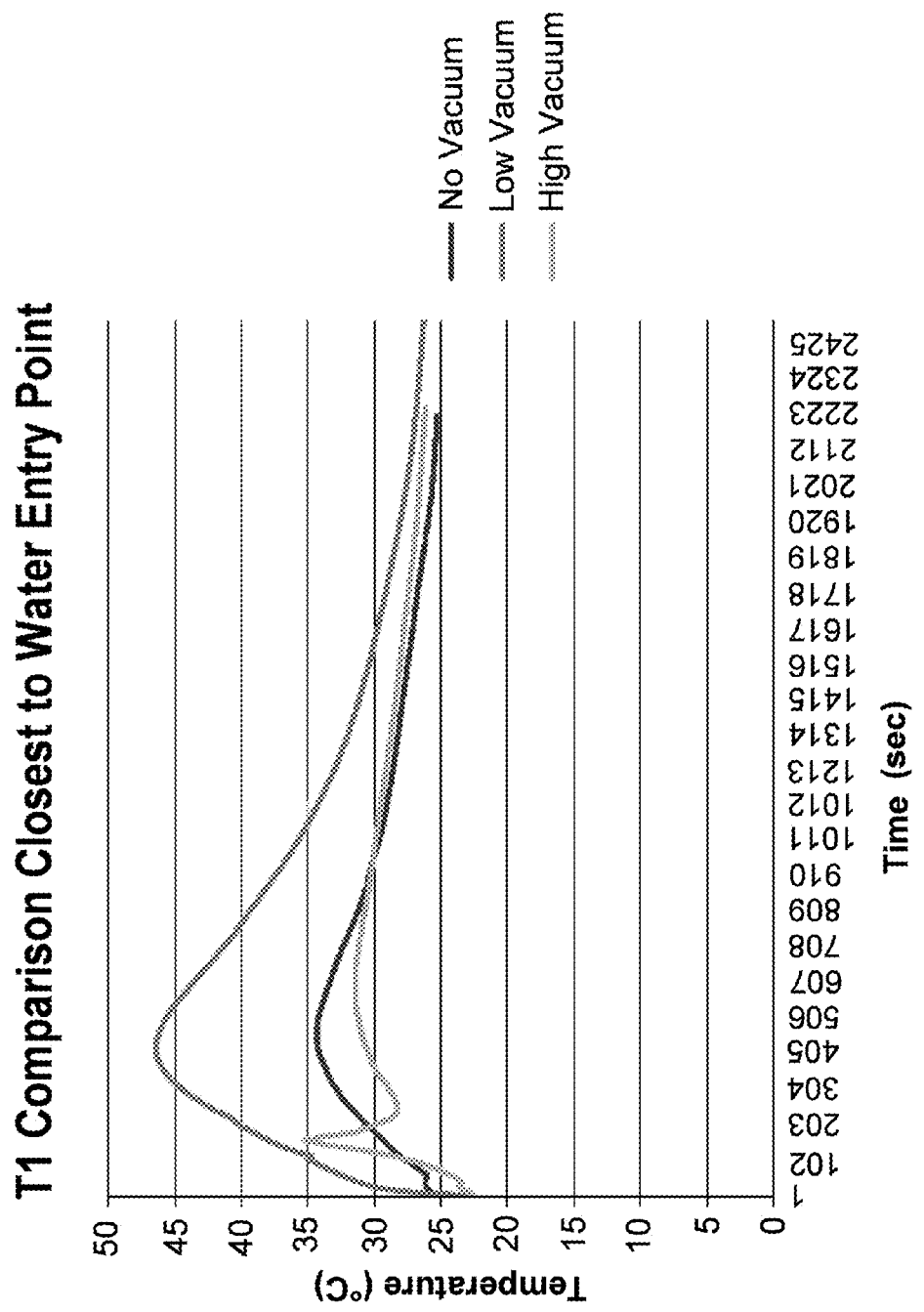
FIG. 5 is a graph showing the effect of vacuum on heat generation profiles around the water injection point for a CaO, zeolite, citric acid reactant mix. The slight (low) vacuum was prepared by subjecting the reactant pouch to 400 mm mercury negative pressure for 4 seconds while high vacuum was subjected to 400 mm mercury negative pressure for 8 seconds.
Figure 6:
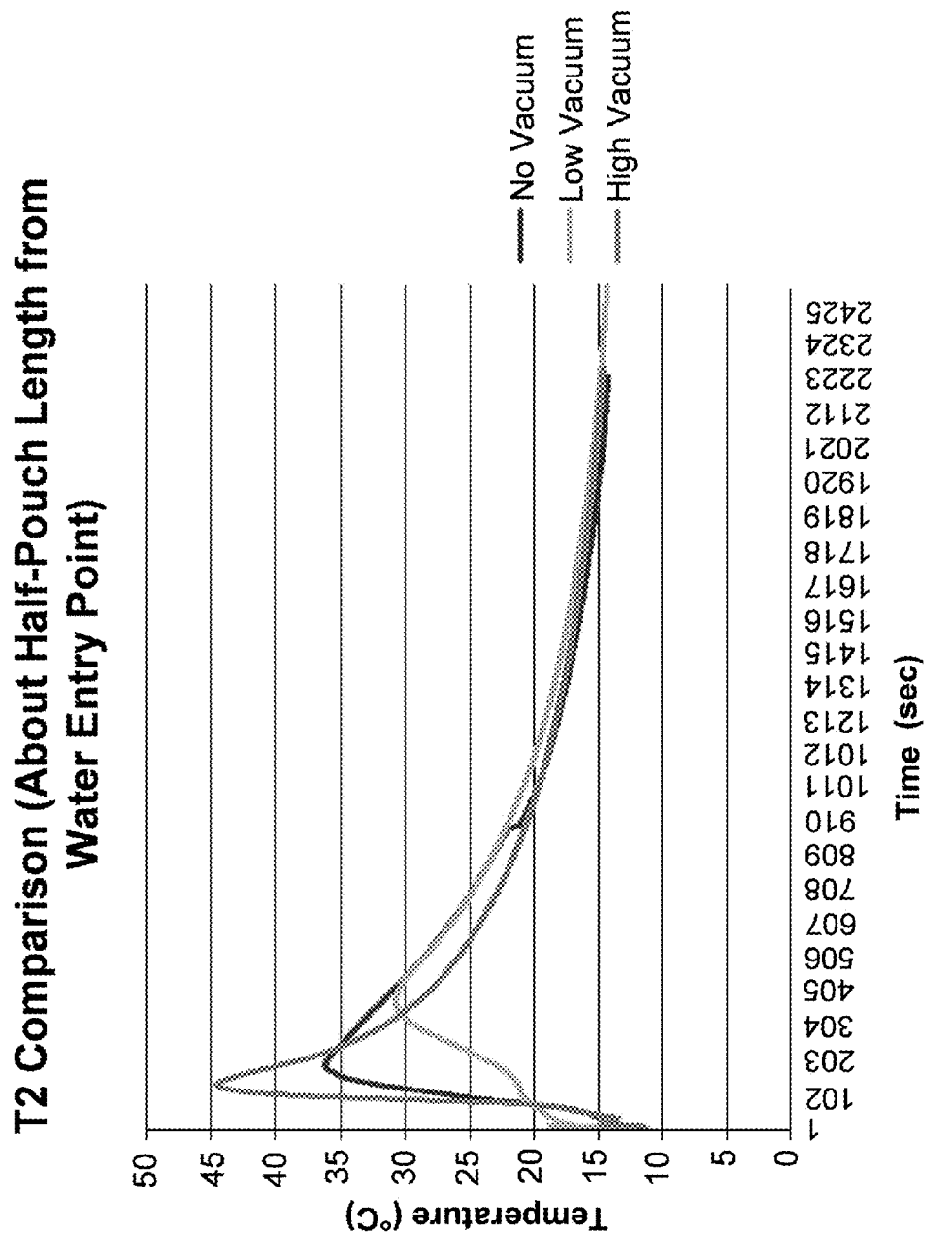
FIG. 6 is a graph showing the effect of vacuum on heat generation profiles around the mid-point of the reactant ponch, for a CaO, zeolite, citric acid reactant mix. The slight (low) vacuum was prepared by subjecting the reactant pouch to 400 mm mercury negative pressure for 4 seconds while high vacuum was subjected to 400 mm mercury negative pressure for 8 seconds.
Figure 7:
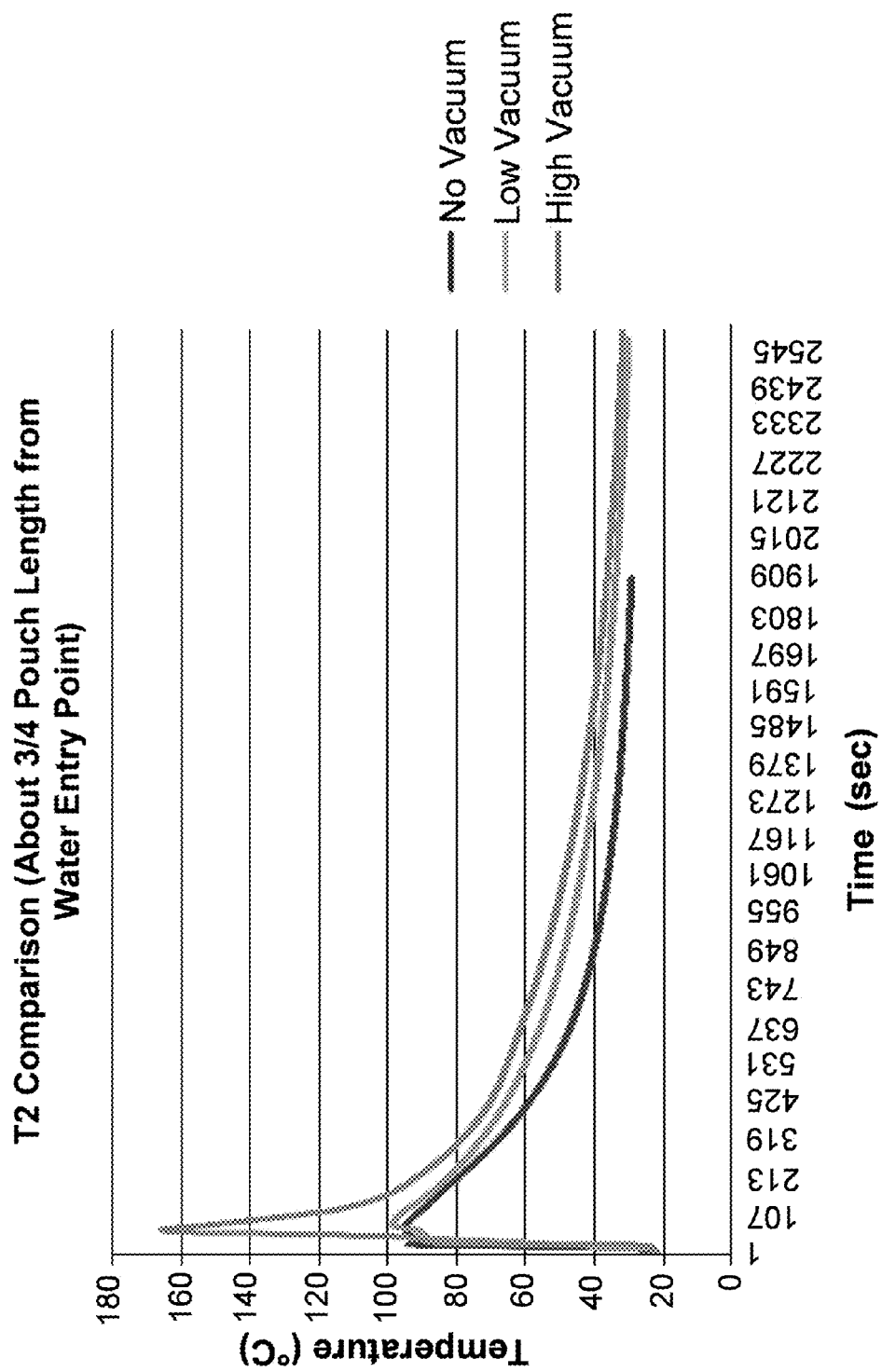
FIG. 7 is a graph showing the effect of vacuum on heat generation profiles around ¾ pouch-length from the injection point of the reactant ponch, for a CaO, zeolite, citric acid reactant mix. The slight (low) vacuum was prepared by subjecting the reactant pouch to 400 mm mercury negative pressure for 4 seconds while high vacuum was subjected to 400 mm mercury negative pressure for 8 seconds.
Figure 8:
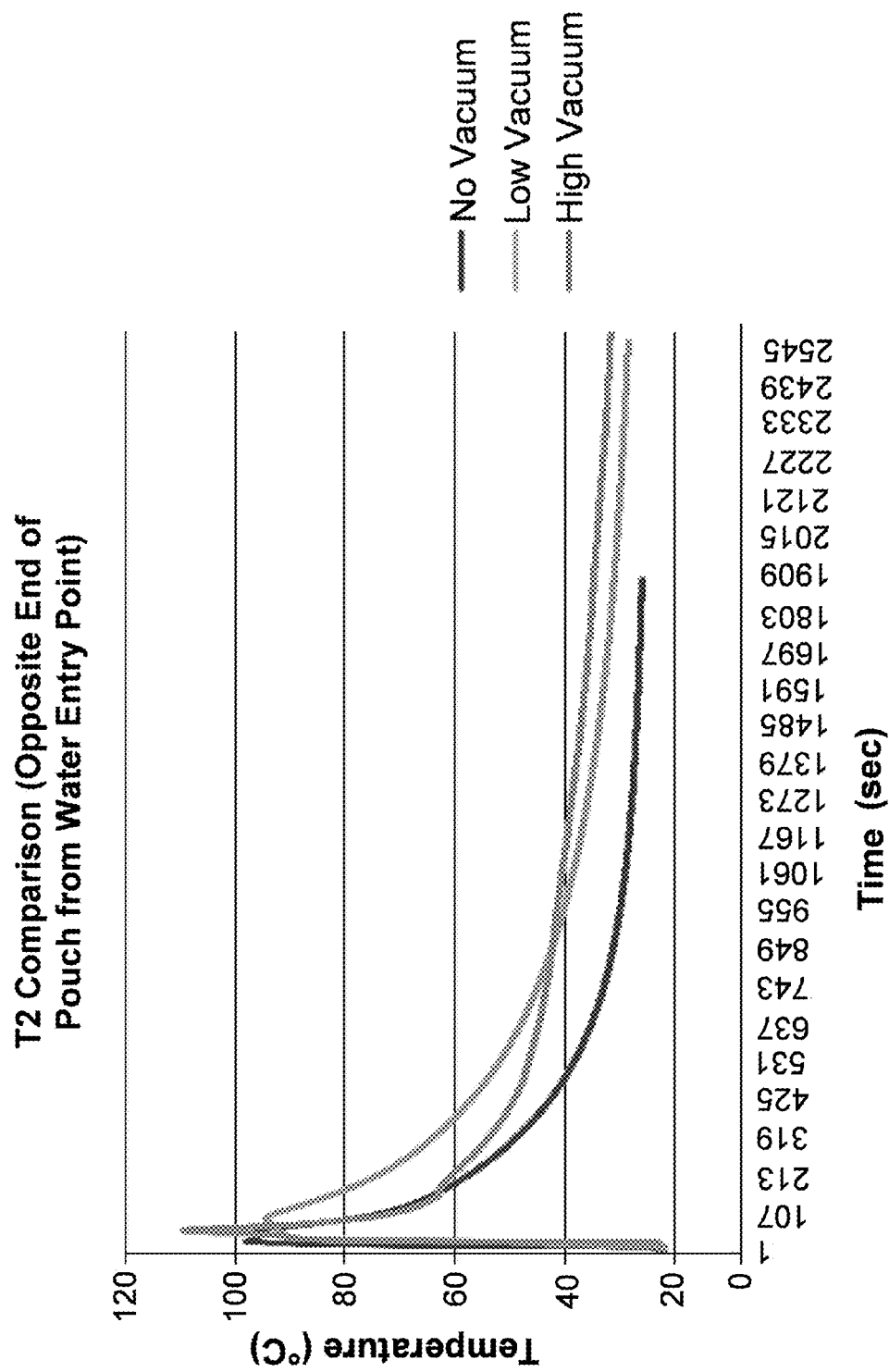
FIG. 8 is a graph showing the effect of vacuum on heat generation profiles at a point furthest from the injection point, for a CaO, zeolite, citric acid reactant mix. The slight (low) vacuum was prepared by subjecting the reactant pouch to 400 mm mercury negative pressure for 4 seconds while high vacuum was subjected to 400 mm mercury negative pressure for 8 seconds.

The zeolite also functions to manage water usage during the exothermic reaction and facilitate water transport through the reactant pouch, especially when the pouch is under vacuum. During initial water introduction, the zeolite absorbs water which is later released through desorption. This water desorption avoids high temperatures and water boil-up and also prevents incomplete reaction and local reaction rates. The zeolite also transports water through inter-particle and intra-particle pores. Without zeolite, the water is trapped in around the injection port, with vapor generation around the injection port and incomplete exothermic reactions occurring away from the water injection port, as seen below. Where the reactants are subjected to vacuum without zeolite, the vacuum causes hot spots and incomplete reaction zones, seen in FIG. 4. In the aforementioned situations, localized hot spots and incomplete reaction zones, vapor generated from the exothermic reaction often ruptures the reactant pouches if a release vent is not used. The inclusion of zeolite with vacuum allows the water to wet more of the reactants and, when optimized, provides an even heat profile throughout the reactant pouch, as seen in FIG. 4.

A series of experiments were performed to test the heat generated by the exothermic reactants in different parts of the reactant pouch, with T1 being the closest to the water injection point and T4 the farthest. The reactants used were 15 g CaO, 6.5 g zeolite (where zeolite was used), and 20 ml water, 2 towels at top and 2 towel at bottoms used. No vacuum implies the system is sealed without application of vacuum. Slight (some) vacuum was prepared by subjecting the reactant pouch to vacuum for 4 seconds vacuuming and vacuum subjected for 8 second vacuuming. The vacuum pump pressure was at 400 mm mercury. There were no absolute readings within the sealed package. The addition of a slight vacuum optimized the wetting of reactants, as seen in FIGS. 5-8.

Figure 9:
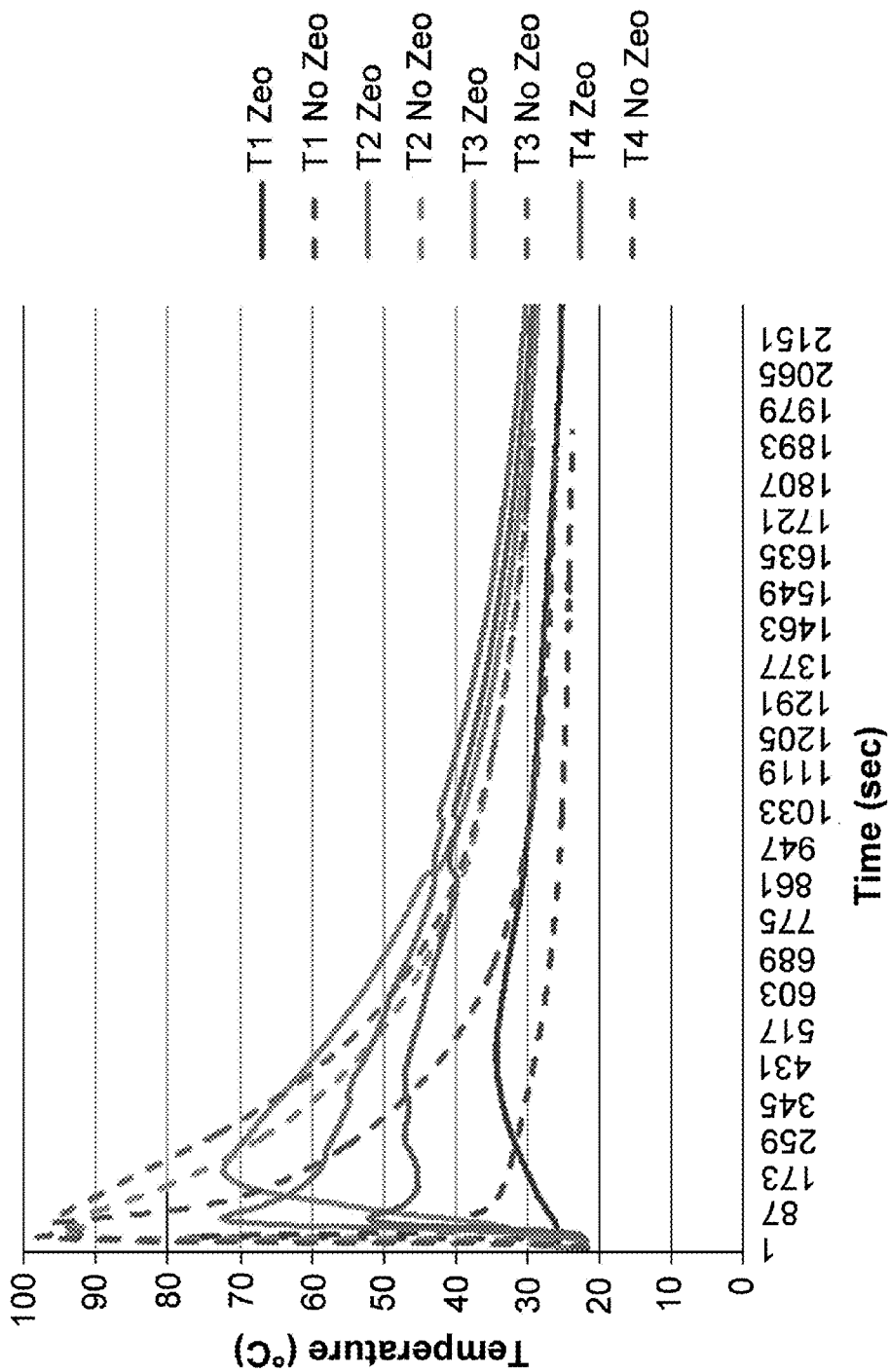
FIG. 9 is a graph showing the effect of vacuum and zeolite on heat generation profiles at different locations in the reactant pouch, for a CaO, zeolite, citric acid reactant mix. The slight (low) vacuum was prepared by subjecting the reactant pouch to 400 mm mercury negative pressure for 4 seconds.
Figure 10:
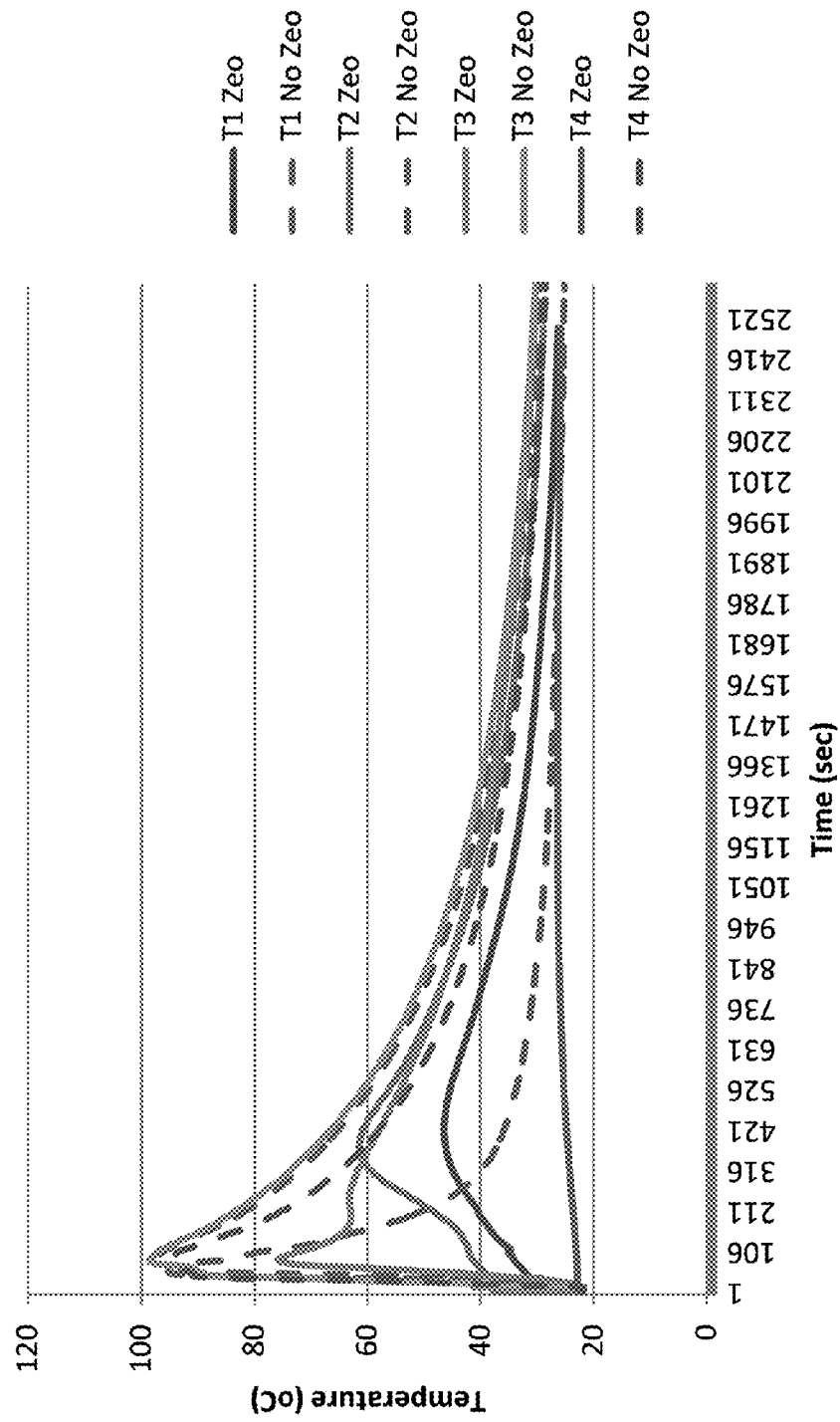
FIG. 10 is a graph showing the effect of vacuum and zeolite on heat generation profiles at different locations in the reactant pouch, for a CaO, zeolite, citric acid reactant mix. The slight (low) vacuum was prepared by subjecting the reactant pouch to 400 mm mercury negative pressure for 4 seconds.
Figure 11:
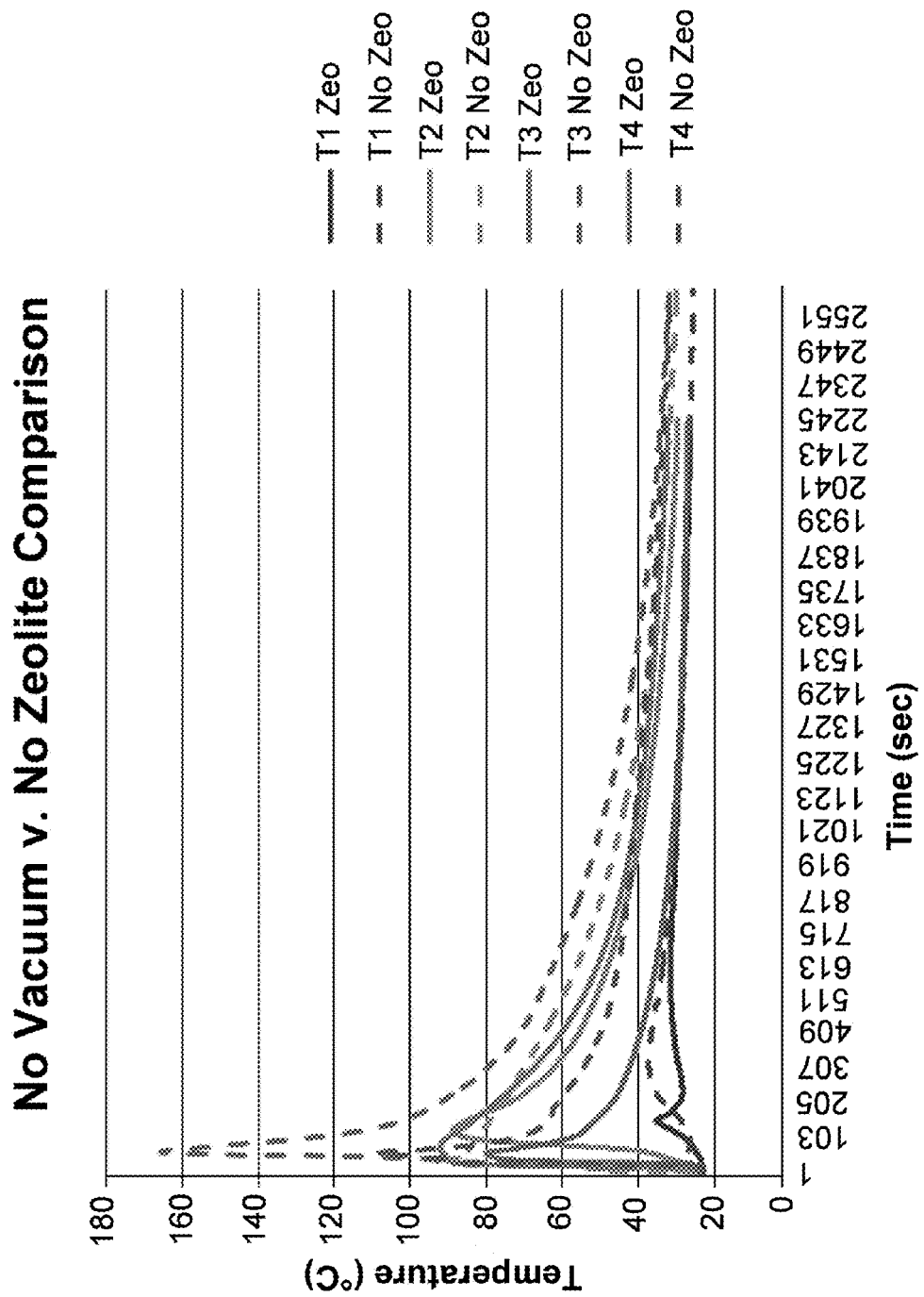
FIG. 11 is a graph showing the effect of vacuum and zeolite on heat generation profiles at different locations in the reactant pouch, for a CaO, zeolite, citric acid reactant mix. The slight (low) vacuum was prepared by subjecting the reactant pouch to 400 mm mercury negative pressure for 4 seconds.

Of note, use of a slight vacuum effect gets water adsorbed and released properly, whereas high vacuum results in bypass of water to other zones and/or high adsorption slower release from the zeolite. The zeolite helps modulate the transfer of water throughout the reaction system with or without vacuum, as seen in FIGS. 9 and 10. Reactions without zeolite show fast, non-moderated reaction while zeolite moderates reaction. This is very prominent with no vacuum. No zeolite systems generate more overall energy possible due to water adsorption and release rates from zeolite. The use of vacuum applied zeolite effect is substantial, seen in FIG. 11, with the reaction occurring much faster under vacuum. The use of a slight vacuum with the zeolite appears to show enhanced water transfer, resulting in a prolonged, smoother profile as discussed above. This is due, at least in part, to zeolite adoption/desorption rates that are well balanced, with the initial heat up rate moderated by balanced vacuum and zeolite. By contrast, the exothermic reaction causes high, fast initial rate without zeolite when no vacuum is used. The modulated temperatures are a result of water wicking by the zeolite, which is enhanced by vacuum when applied, and by the heat sink properties of zeolite. Thus, the exothermic reactions are more consistent throughout the reaction, spatially and temporally.

Figure 12:
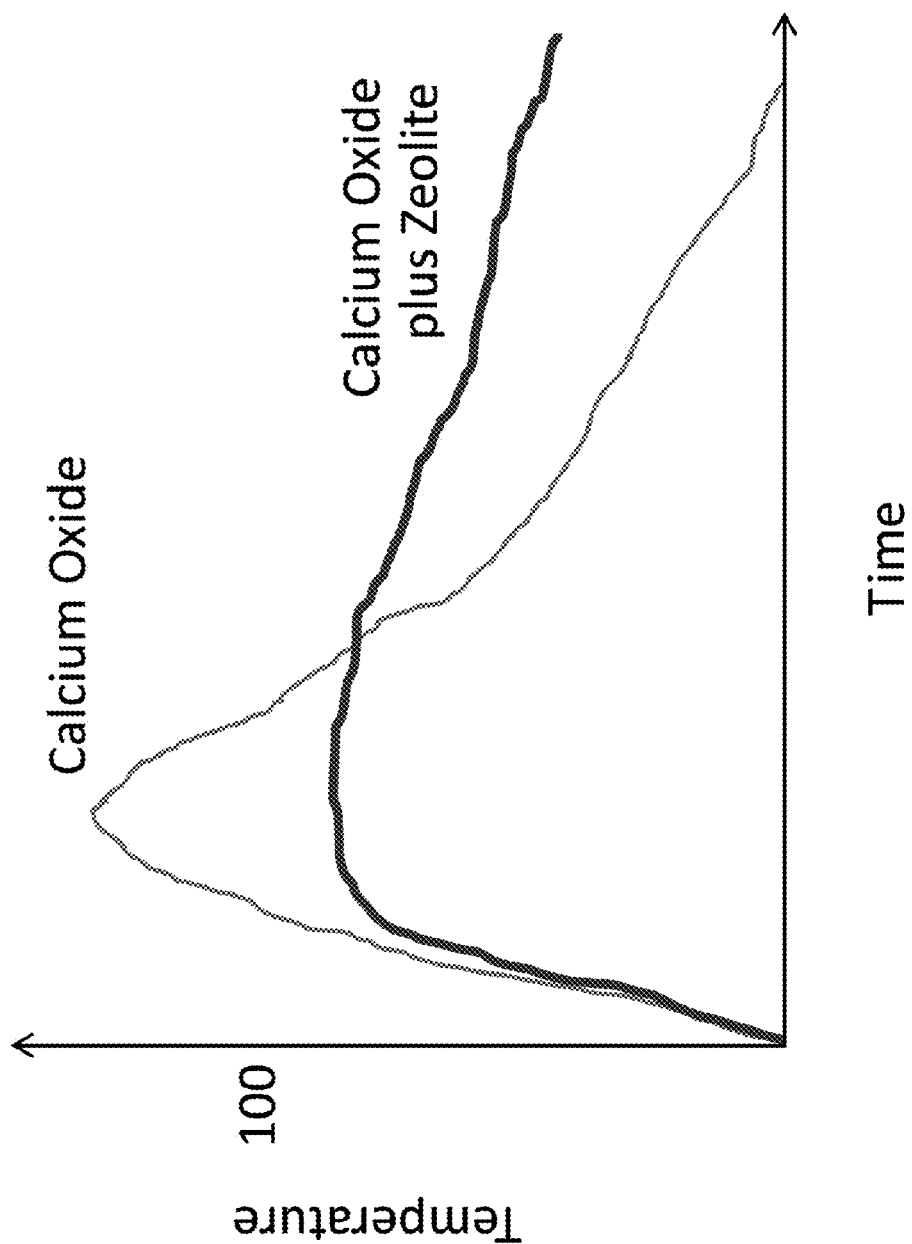
FIG. 12 is a graph showing the effect of citric acid or citric acid and zeolite on heat generation profiles of CaO.

Further, a weak acid may be used as a buffer or encapsulant for the reactants for sustained modulation of temperature and pH, and in some situations provide additional heat through neutralization reactions. Exemplary compounds include acids such as citric acid, tartaric acid, oxalic acid, orthophosphoric acid, and sulfamic acid, and acid salts such as sodium hydrogen sulfate and potassium hydrogen sulfate. Adding citric acid to the reactants limits accumulation of calcium hydroxide, as seen in FIG. 12.

$$3Ca(OH)_2 + 2C_6H_8O_7 \rightarrow Ca_3(C_6H_8O_7)_2 + 6H_2O$$

calcium hydroxide+citric acid→calcium citrate

Figure 13:
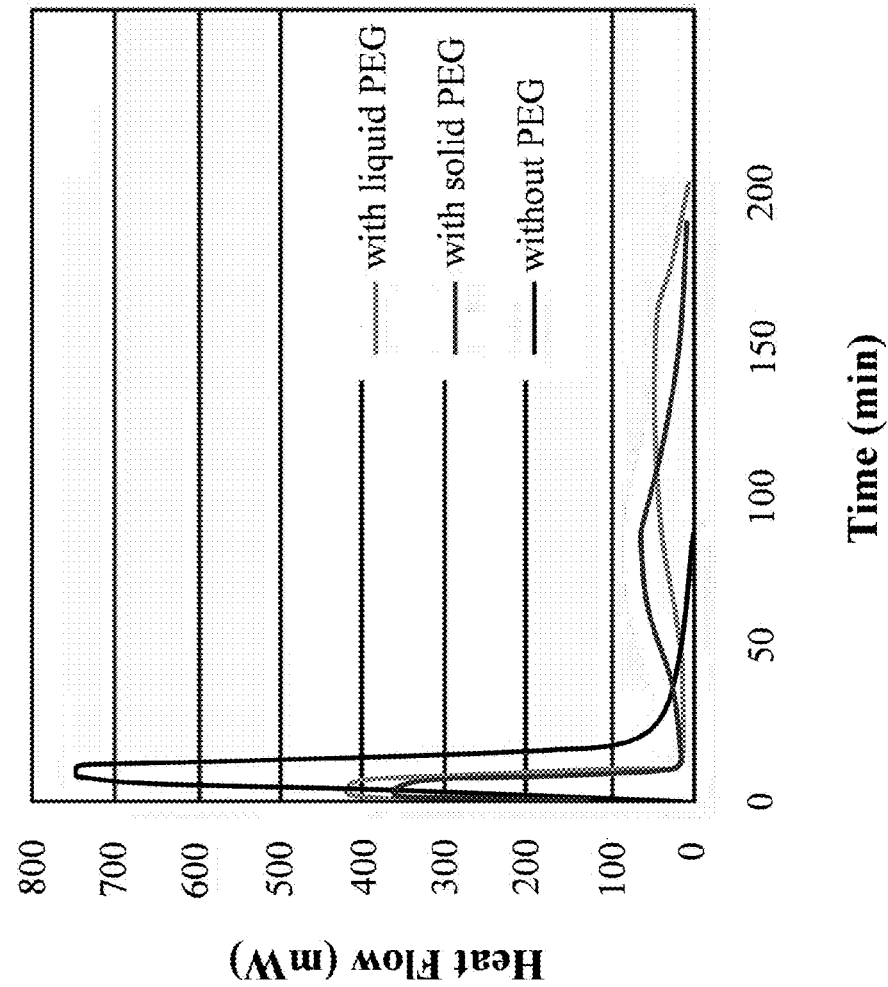
FIG. 13 is a graph illustrating the heat evolution after wetting of the CaO and zeolite mix.

The solid reactants are hydrolyzed with liquid components, consisting of water and an optional surfactant. The surfactant is added to the system to delay wetting of the solid reactant surface as well as the hydrolysis reaction between the solid reactant and adsorbed water intermediate. Non-limiting examples include glycerol and ethylene glycol, both monomer and polyethylene glycol (PEG) with different molecular weights. Monomers and low molecular weight polymers are in the liquid phase and are completely miscible with water. Higher molecular weight PEG exists in solid form. Experiments were performed with solid PEG mixed with CaO and Zeolite prior to the reaction. In specific embodiments, a zeolite/PEG ratio of 0.5 to 5 is used, or alternatively a water/ethylene glycol ratio between 0.25 and 1.5. In the case of solid PEG, the initial heat produced is utilized for melting PEG. PEG, during later stages of reaction, changes phase back to solid form to release additional heat. Water and hydrocarbons were mixed in different ratios. The addition of a surfactant, such as PEG, to the exothermic reactants reduces the maximum temperatures reached and slows the reaction time, as seen in FIG. 13. Without being bound to any specific theory, it is believed that the surfactant coats the solid from the aqueous solution and resulted in limited wetting of the surface. For example, as surfactant dissolves off CaO, the CaO solid intermediate forms $Ca(OH)_2$. After that, the surfactant began to re-dissolve in water. This allowed contact of more water with the surface. The effect was a function of the water to PEG ratio, for which the water to poly- or mono-glycol ratio is more than one. It is noted that the preferred ratio range is 3-10.

Example 1: Self-Heating Reaction System

A chemical mix composed of 7.5 g of CaO, 4.5 g zeolite, and 3 g citric acid was prepared for analyzing the heat generated from the exothermic reaction. Alternatively, citric acid was not added to the mix. In cases where citric acid was not used, the mix was composed of 84% CaO and 16% Zeolite, with the total amount of chemicals and water used is the same regardless of use of a weak acid. As shown, the system can heat quickly and maintain a uniform and high temperature. The combination of CaO and zeolite allow for effective, long-term exothermic reaction, as the CaO reacts quickly, while the zeolite stores heat and conducts the heat uniformly. This prevents excess hot spots and allows the zeolite to "hold" the heat to provide sustained heat transfer.

Figure 14:
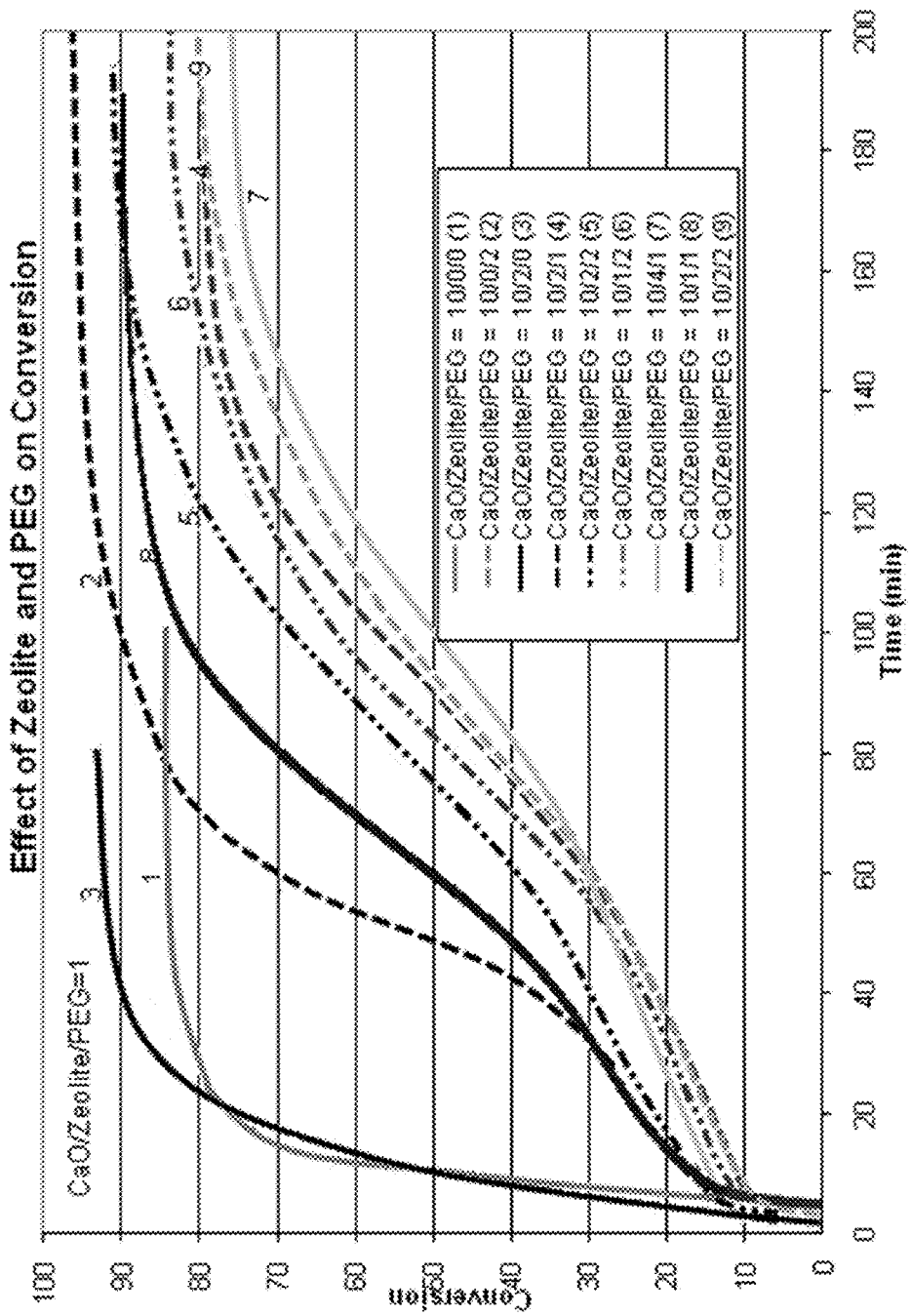
FIG. 14 is a graph illustrating the effect of different zeolite to PEG ratios on conversion of CaO and zeolite to the byproduct.
Figure 15:
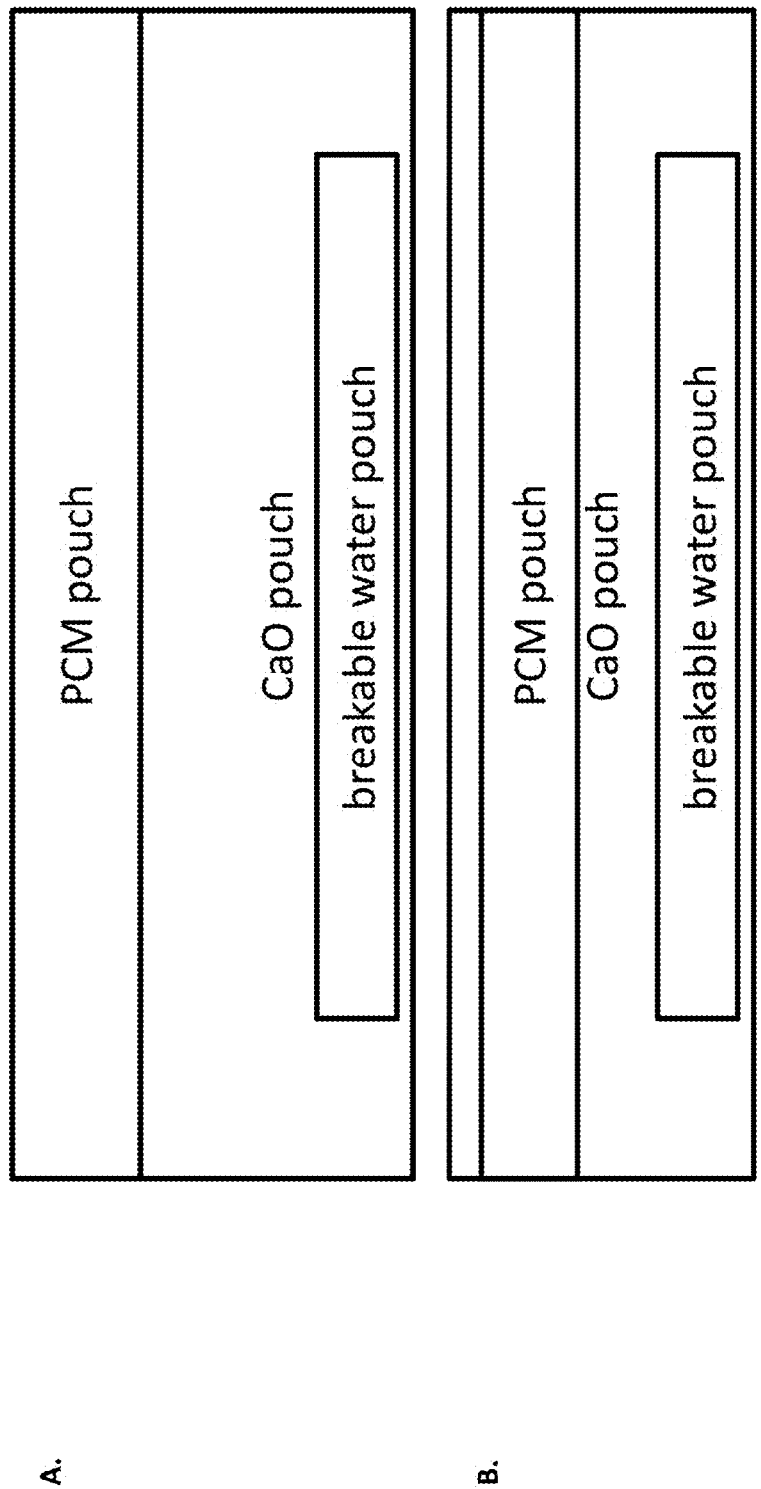
FIGS. 15 (A) and (B) are illustrations showing the present invention used in an exothermic pouch, such as a heating device. (A) PCM placed in an adjacent pouch; and (B) PCM placed in a pouch inside the chemical heater.
Figure 16:
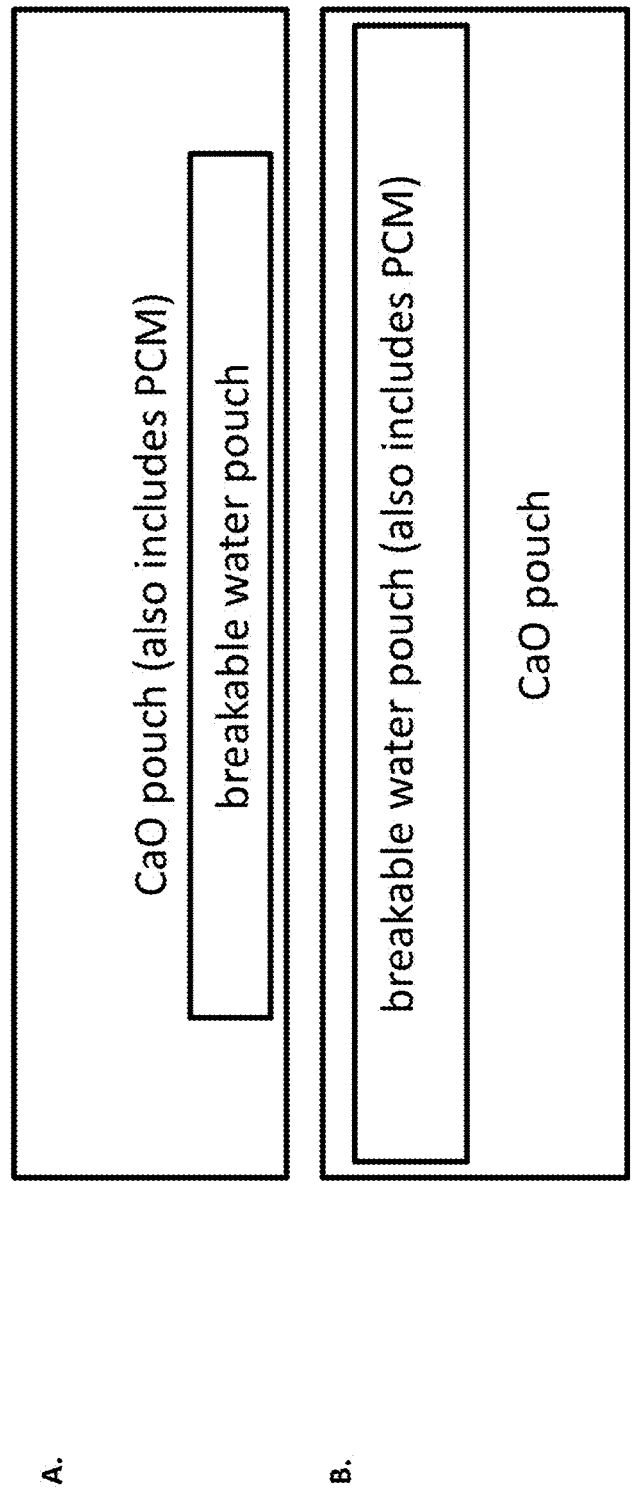
FIGS. 16 (A) and (B) are illustrations showing the present invention used in an exothermic pouch, such as a heating device. (A) PCM placed inside the chemical pouch; and (B) PCM placed inside the water pouch.

The addition of PEG surfactant slowed the hydration, and therefore the initial heating. Solid PEG was mixed with CaO and Zeolite, at a zeolite/PEG ratio of 0.5 to 5, prior to the reaction. The effect of PEG was a function of CaO/Zeolite/PEG ratio, as seen in FIG. 14.

Example 2: PCM-Modulated Self-Heating Reaction Systems

Figure 17:
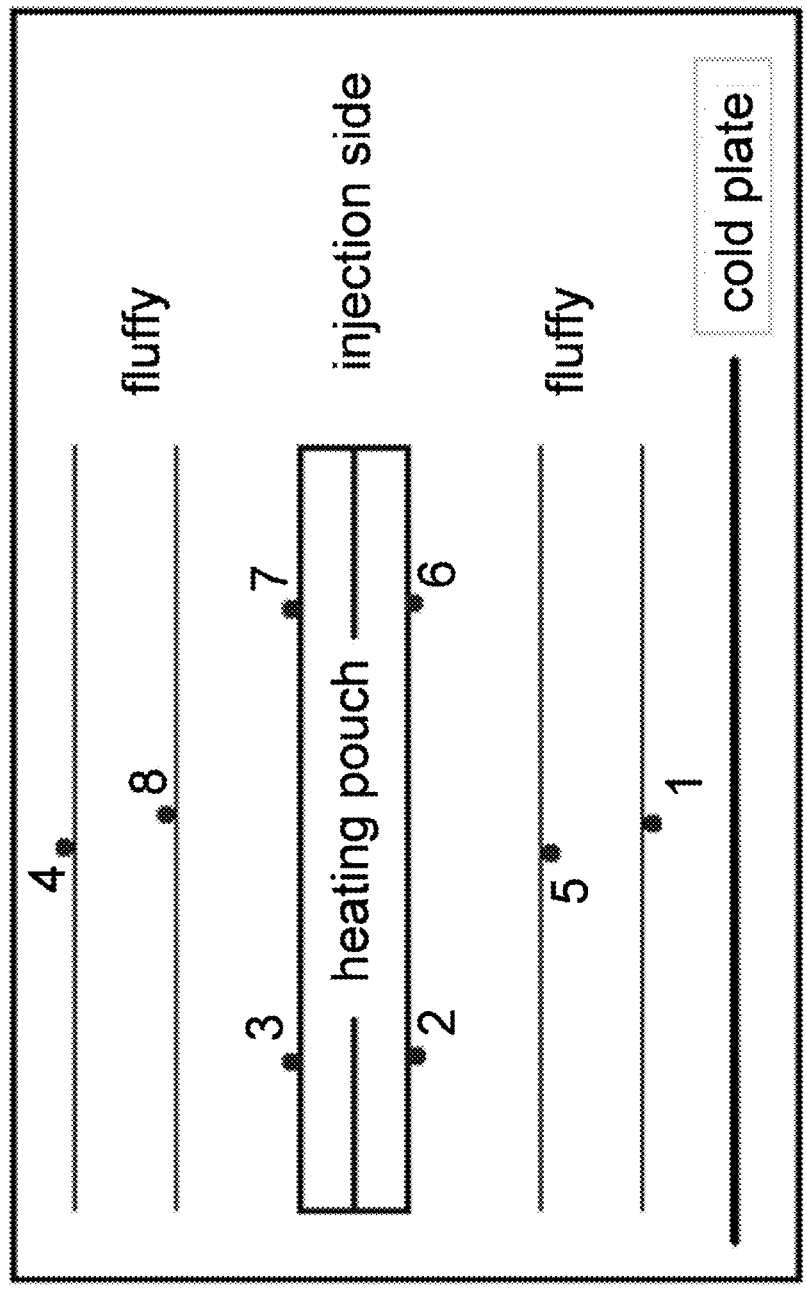
FIG. 17 is a diagram of the present invention, showing probe testing locations.

This invention provides means to decrease the reaction rate, which is useful for some application purposes, such as prolonged food and beverage heating and cooling. A self-heating chemical system was prepared using calcium oxide as the first solid reactant and zeolite as the second solid reactant. Phase change materials, provided below, were added as a heat sink to modulate the temperature of the reaction. Exothermic reactions, mixing of some chemicals, sorption of certain chemicals, phase changes in chemicals, and dissolution of some chemicals in solvents release heat during these operations. The rate of heat generation coupled with mass and energy transfer rates to or from system(s) allows modulation of the temperature of systems. CaO-Zeolite mixture was hydrolyzed with the surfactant/water mixture, described below. The reactant mix is designed to provide fast initial reactions for immediate initial heating, followed by modulated temperature and to have prolonged heating at reasonable constant temperature. Heating systems were designed to test the modulated temperature reactions, as shown in FIGS. 15(A) through 16(B). Probes were added to the reactant pouch, as seen in FIG. 17. The exothermic reaction between CaO and water in the presence of Zeolite has a complex mechanism. There are at least two steps involved in the reaction mechanism. The first step is the wetting of CaO and Zeolite surfaces. Once the water is adsorbed on the surface and the surface is wetted, hydrolysis reaction between CaO and water starts.

Adding a surfactant slows the hydrolysis, as the surfactant is first adsorbed on the solid from the aqueous solution and resulted in limited wetting of the surface. For example, as surfactant dissolves off CaO, the CaO solid intermediate forms Ca(OH)$_2$. After that, the surfactant began to re-dissolve in water. This allowed contact of more water with the surface. The effect was a function of the water to surfactant ratio. For PEG, the water to poly- or mono-glycol ratio may be more than one, especially a ratio in the range of 3-10. Further, as surfactant concentration increased, the rate of the hydrolysis reaction decreased. It is also noted that hydrolysis rates decreased with increasing zeolite concentration.

Figure 18:
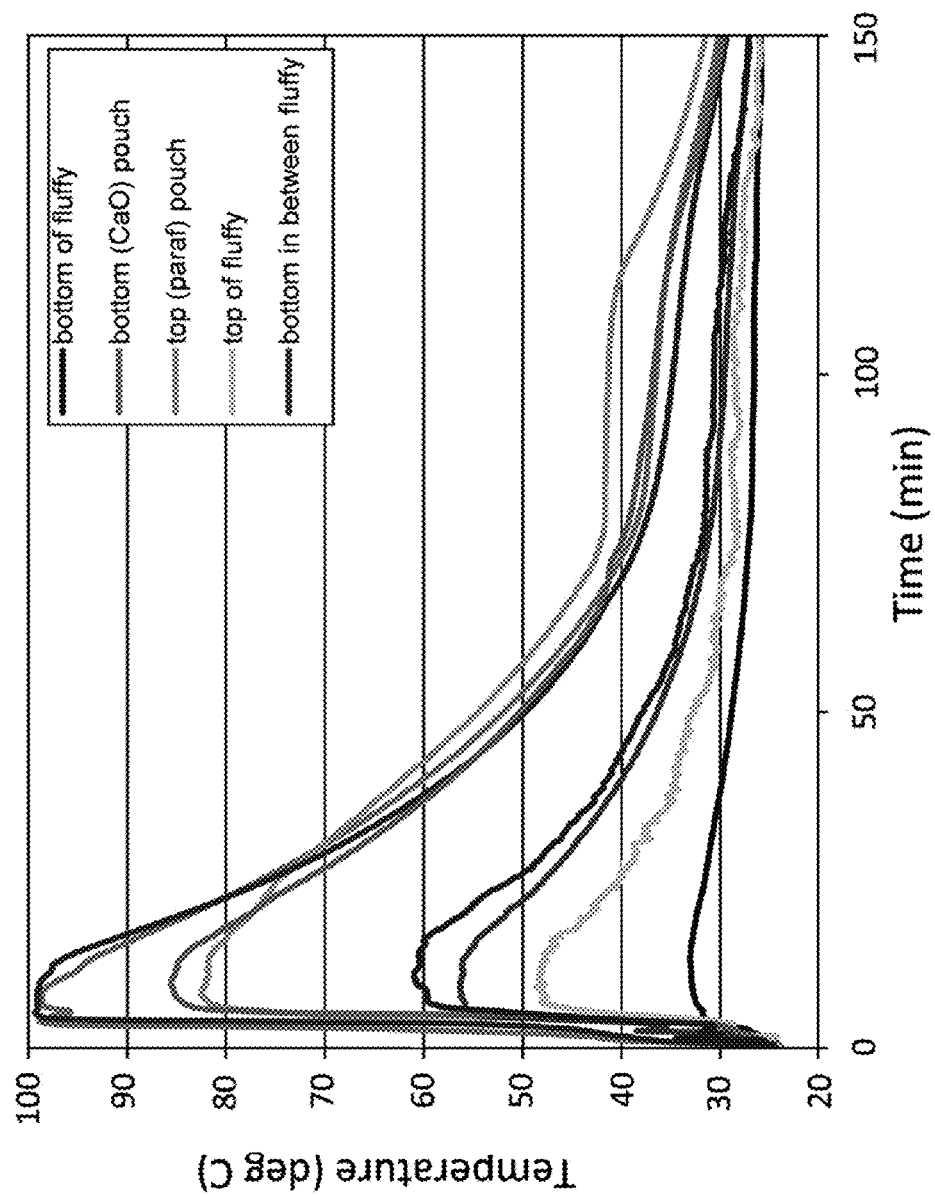
FIG. 18 is a graph showing the temperature modulation of an exothermic reaction. Reactant conditions are 25 g CaO, 10 g Lauric acid, 5 g PEG, 5 g zeolite, 30 g $H_2O$, 20 g Lauric acid.

A composition using lauric acid, as shown in Table 2, showed enhanced modulation of temperature, as seen from the temperature curves in FIG. 18, compared to reactions without the lauric acid (CaO lines). The first sharp peak in the heat evolution curve is an indication of rapid increase in temperature in the self heating system. This excessively high temperature is typically not desirable due to safety concerns, such as contact with the heating system (i.e. burn injuries) or critical pressure build-up in the heating container which may result in rupture of the system. However, the use of lauric acid kept the initial temperature from elevating as much as in CaO reactions.

TABLE 2

| Reactant | Amount (g) |
| --- | --- |
| Lauric acid | 20 |
| CaO | 25 |
| Zeolite | 25 |
| PEG | 5 |
| Lauric acid | 10 |
| Water | 30 |

Figure 19:
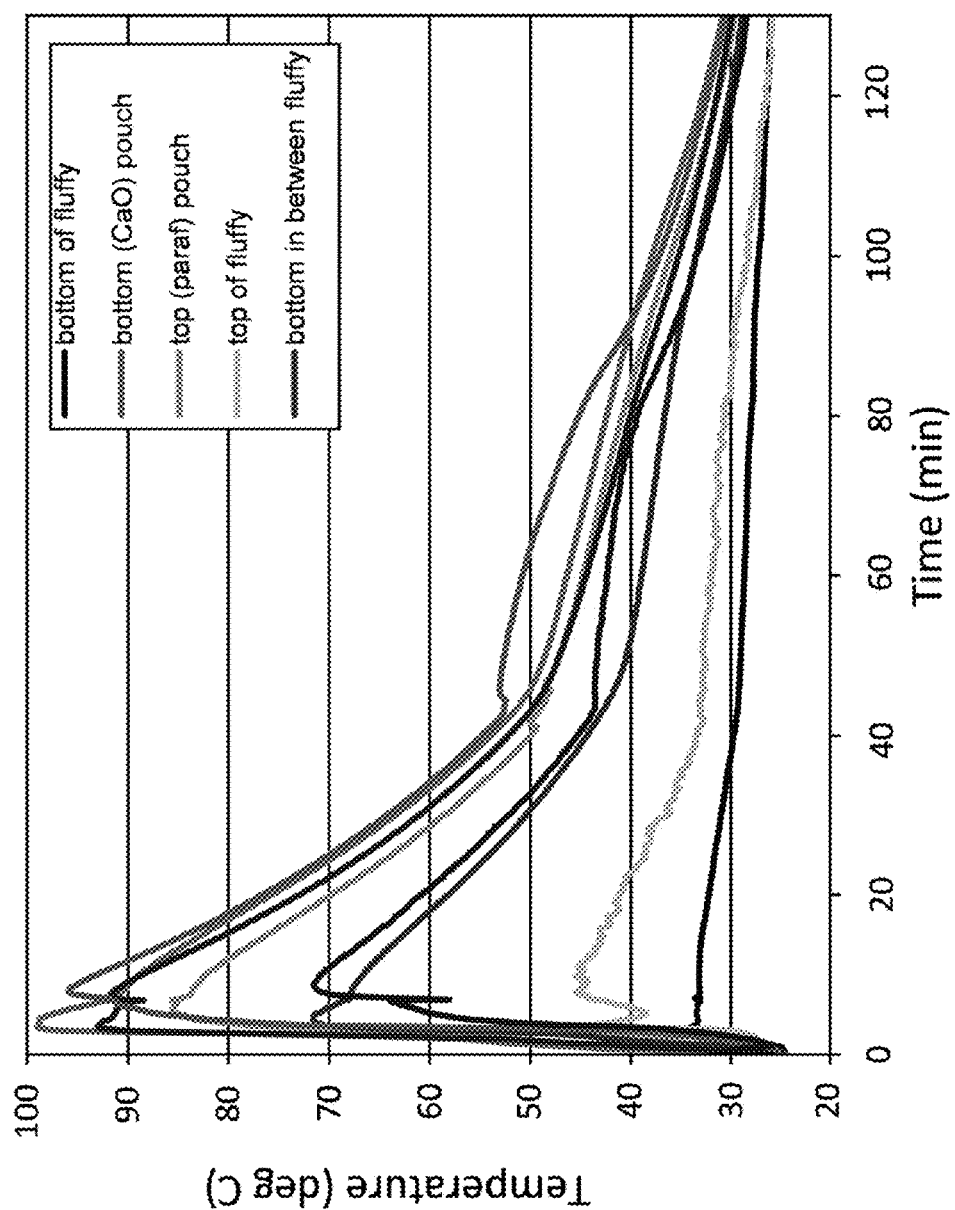
FIG. 19 is a graph showing the temperature modulation of an exothermic reaction. Reactant conditions are 25 g CaO, 10 g Myristic acid, 5 g PEG, 5 g zeolite, 30 g $H_2O$, 20 g Myristic acid.

A second modulating composition was created using the components shown in Table 3. As seen from the temperature curves in FIG. 19, myristic acid acts similarly to lauric acid, modulating the temperature.

TABLE 3

| Reactant | Amount (g) |
| --- | --- |
| Myristic acid | 20 |
| CaO | 25 |
| Zeolite | 25 |
| PEG | 5 |
| Myristic acid | 10 |
| Water | 30 |

Figure 20:
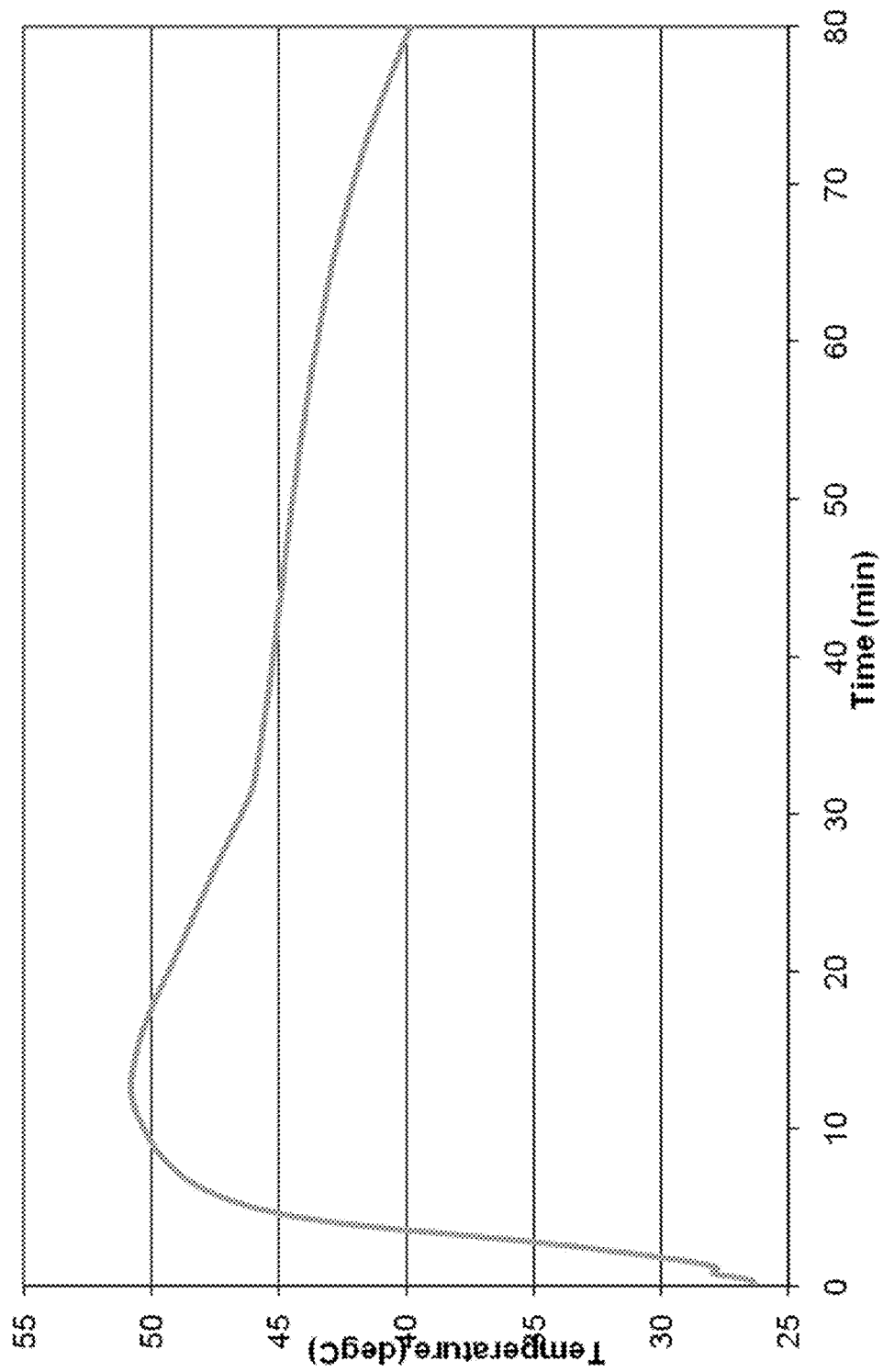
FIG. 20 is a graph showing the temperature profile obtained with the Calcium Oxide in a paraffin system.

A similar reaction system was prepared using paraffin. Heating profiles were similar to the lauric acid and myristic acid PCM-modulated systems, as shown in FIG. 20.

As seen in the Figures, the compositions advantageously limit the heat produced at the first stage of the reaction. The first sharp peak in the heat evolution curve is an indication of rapid increase in temperature in the self heating system. This excessively high temperature may not be desirable due to safety concerns, such as contact with the heating system (i.e. burn injuries) or critical pressure build-up in the heating container which may result in rupture of the system. The modulated profiles show heat released from exothermic reactions was used to heat the PCMs just above their melting point, followed by the PCM holding the temperature constant for an extended period via phase change. Further, a continuous use of heat provides an extended time up to a few hours instead of 10-20 minutes through modulating the reaction conditions as described.

The heat exchange between reacting chemical (e.g. CaO) and PCMs (e.g. paraffins) can be direct, such that the exothermic reactants are combined. For example, CaO may be mixed with lauric acid or other PCM. Conversely, the exothermic reactants may be in a separate compartment from the PCM, causing phase changes through indirect heat transfer.

Example 3: PCM-Modulated Self-Heating Reaction Systems

Figure 21:
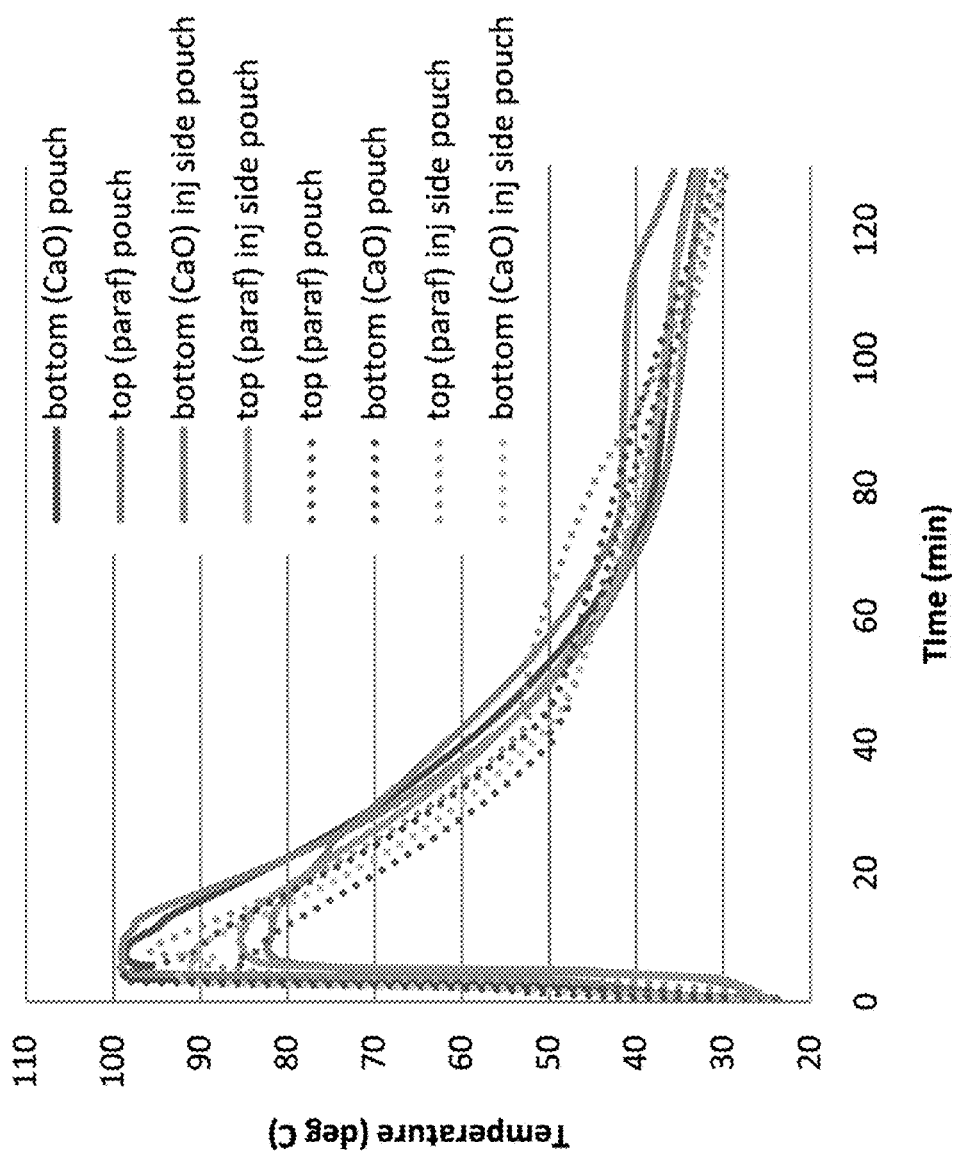
FIG. 21 is a graph showing the temperature modulation comparing reactions using Lauric acid (solid lines) versus Myristic acid (dotted lines).

Adding a surfactant, such as PEG, to the composition reduces the maximum temperatures reached and slows the reaction time, as seen in FIG. 21.

The present invention facilitates the time-temperature modulation of heating. Furthermore, components, principally the water which initiates the reaction is sequestered, while upon the rupture of the water pouch the chemical component system enables the effective missing of the water with the chemicals. In certain aspect, the two pouch system utilizes heating components such as CaO/Zeolite/Citric acid in an outer pouch that is vacuumed. The inner pouch contains the water. When you break the inner pouch by squeezing pouches, the inner pouch breaks and water rapidly permeates and diffuses into the chemicals. In addition to CaO mixture, other exothermic reaction mixes were used, including an Al alloy and Mg plus Iron.

The aluminum alloy mix includes a base, such as sodium hydroxide. Al reacts with water and generates hydrogen, forming an oxide layer, as seen below.

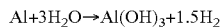

$$Al + 3H_2O \rightarrow Al(OH)_3 + 1.5H_2$$

NaOH cracks the outer Al(OH)3 layer to let water contacting Al faster. Other variations include a Al—CaO mix, containing about 40% Al, and CaO, which generates 6.9 KJ/g heat.

The Mg—Fe mix reacts with water generate hydrogen. Fe—Mg works as two electrodes in salty water system.

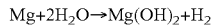

$$Mg + 2H_2O \rightarrow Mg(OH)_2 + H_2$$

NaCl is added to system to make reaction easier to happen. Current Mg—Fe alloy mix contains about 40% Mg and generates about 6.6 KJ/g Heat.

Further, the exothermic reactant mixes can be combined. For example, CaO and Mg—Fe mix or Al and Mg—Fe mix can be used. These combination reactant mixes provide useful combinations of reactant conditions, because CaO and Al reacts fast while Mg—Fe mix reacts steady and for a long period. Initially the reactive mix melts the PCM fast and PCM solidifies slowly at constant temperature due to heat loss to surroundings. The reactive mix (particularly Mg-Iron) further delays through steady heat supply.

Figure 22:
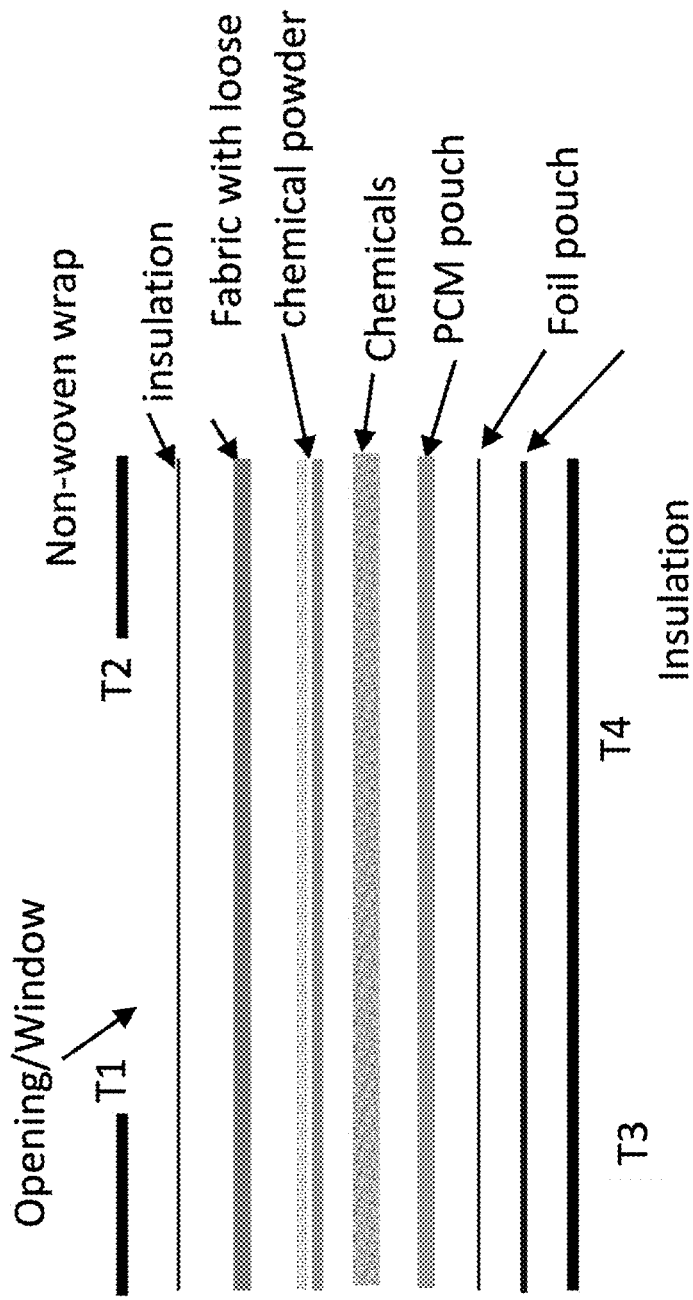
FIG. 22 is a diagram of the self-heating packaging system, with the location of test probes.
Figure 23:
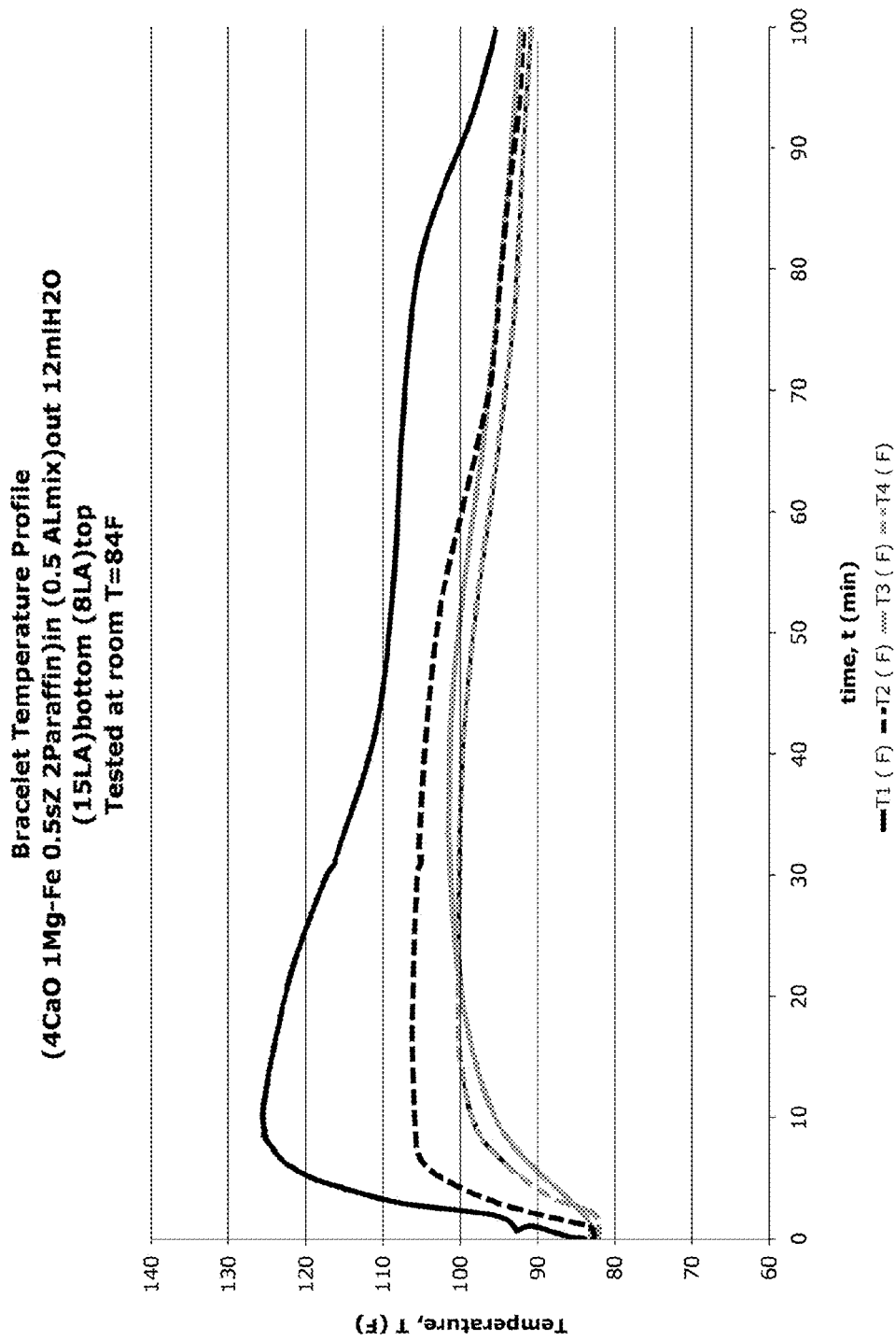
FIG. 23 is a graph illustrating temperature profiles for a system with a composition including 4 g. of CaO, 1 g Mg, 0.5 g Fe, 2 g paraffin, 15 g lauric acid bottom layer, and 12 ml. water. The graph illustrates the temperature at various points within the pouch, as indicated in FIG. 22.

Combination reactant mixes, such as CaO with Mg—Fe are used with a PCM, such as lauric acid, myristic acid, or paraffin. As seen in FIG. 22, adding paraffin and/or other PCMs like lauric acid, to the CaO/Mg—Fe reactant provides a slight initial temperature spike, followed by a continual, steady level of heat generation throughout the 75 minute test. Adding additional amounts of PCM further modulates the reaction, as seen in FIG. 23.

Example 4: Self-Heating Packaging

Package 10 comprises item pocket 2 and temperature changing element 5, as seen in FIG. 22. Opening 3 is disposed on an outer surface of package 10, thereby permitting access to item 20.

Figure 24:
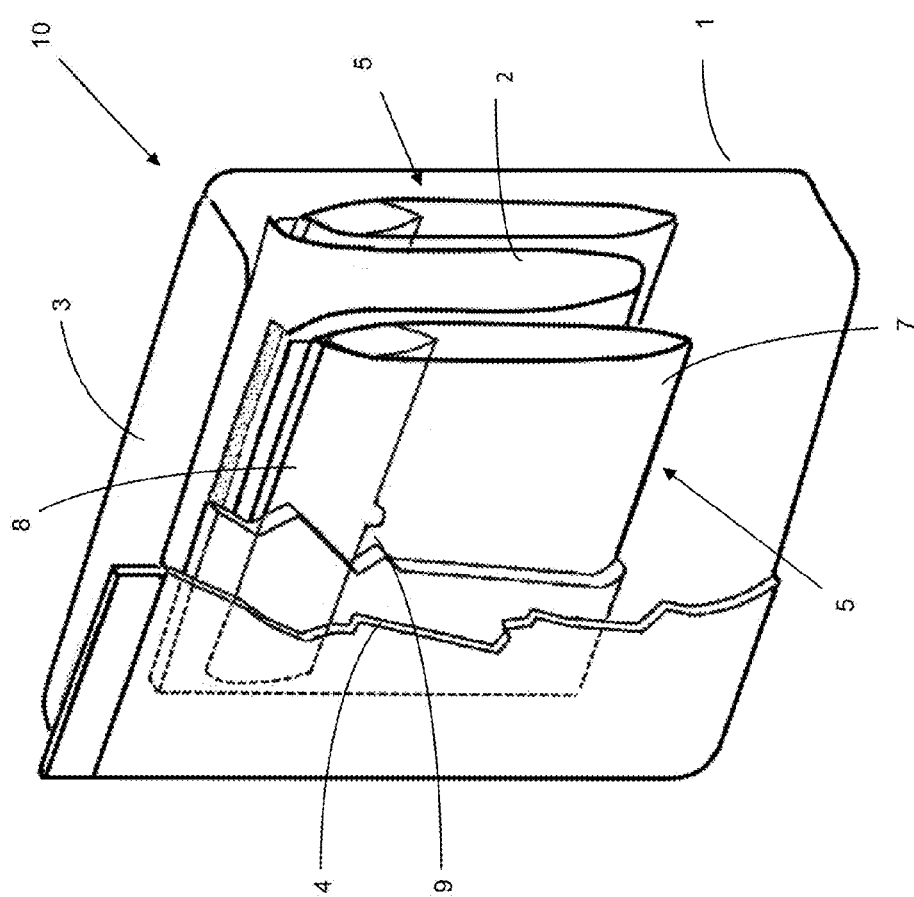
FIG. 24 is a diagram of the self-heating packaging system of the present invention.

Temperature changing element 5 may be suspended from the walls of package 10. Alternatively, temperature changing element 5 can be formed to be integral with outer walls 1, as seen in FIG. 24. Alternatively, temperature changing element 5 is optionally fixed to the inner surface of outer wall 1, such as by a strip of adhesive. In specific embodiments, the temperature changing element 5 is a self-contained, two-chamber unit comprises solid reactant containment membrane 7 and liquid reactant containment membrane 8. The temperature changing element 5, including the multiple components of temperature changing element 5, are housed in adjacent chambers separatable by a rupturable barrier or seal, such as a frangible seal.

As seen in the figure, liquid reactant containment membrane 8 is disposed within solid reactant containment membrane 7, however the only requisite is that the two membranes are oriented to allow the solid and liquid reactants to mix. Any orientation of the containment members that permits such mixing is envisioned, such as having the solid reactant containment membrane disposed within the liquid reactant containment membrane. Temperature changing element 5 can include water impermeable or moisture impermeable containment membranes 11 formed into a pouch having two or more containment chambers which separately contain the solid reactants in one and the liquid reactants, such as water and optionally liquid surfactant, in the other, prior to activation. The containment membranes may be formed from a metalized film or other material having a low moisture vapor transmission rate (MVTR), thereby limiting the release of liquid reactants until the seal or other device is broken. The membranes may be flexible or rigid, such as a metalized film, foil laminate film, MYLAR™, a formed metal sheet, or any other moisture and/or water impermeable material. Temperature changing element 5 can be permanently sealed about its periphery to include solid reactant containment membrane 7 and liquid reactant containment membrane 8. The containment membranes are sealed such that the materials contained therein cannot access item pocket 2 of package 10, preventing mixing with item 20. Heat-sealing, adhesive, or other attachment method may be used to affix the containment membranes to package 10. In some embodiments, temperature changing element 5 is partially or fully encased with insulation 4, thereby limiting the transfer of heat to outer walls 1 and, where temperature changing element 5 is fully encased, heat transfer to item 20 is also reduced.

Figure 25:
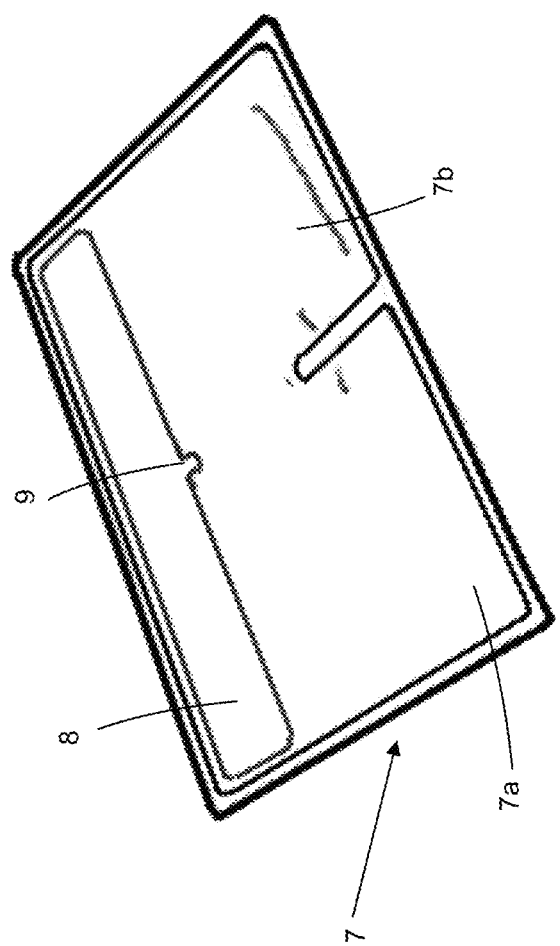
FIG. 25 is a diagram of an optional embodiment of the temperature changing element, showing the solid reactants divided by a seal.

The element may also include a seal about the periphery and across the width of the solid containment membrane to separate the solid containment membrane into smaller reactant compartments 7a and 7b, as seen in FIG. 25. The reactant compartments 7a and 7b can be connected by a gap in the seal to permit liquid reactants to readily flow between the two reactant compartments.

A seal or other device prevents mixing of the liquid and solid reactants until the desired time. The rupturable barrier, seal or other device used to prevent mixing of the liquid and solid reactants may be any known in the art. A non-limiting example includes frangible seal 9. Frangible seal 9 can be ruptured by pressure applied to one or more of the containment membranes. Alternatively, the seal between solid reactant containment membrane 7 and liquid reactant containment membrane 8 may include weakened portions of the seal between the containment membranes. The frangible seal can extend across all or a portion of the width of the heating element. In one embodiment, a frangible seal may be punctured by a method known in the art, such as scores, perforations, or materials such as pull tabs, metal shavings, and other items that can puncture the containment membrane or seal. Applying pressure to one of the containment membranes, such as by squeezing, pressing, or kneading, ruptures the seal. Upon compression of at least one of the containment membranes, or other method known to break the seal, the seal ruptures, permitting the liquid reactants to flow into the solid reactant containment membrane 7, thereby contacting the solid reactants.

In some embodiments, the solid components are under negative pressure, such as a slight vacuum. The vacuum provides an avenue for rapid and thorough mixing of the liquid reactants with the solid reactants. The resulting reaction avoids hot spots due to improper mixing that happens during the initial period. Furthermore, vacuumed containment results in more uniform and higher temperatures, at latter periods, upon mixing. Further, the porous zeolite allows intra-particle void space.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a modulated exothermic reaction system, it will be apparent to those skilled in the art that variations and modifications are possible without deviating from the broad spirit and principle of the present invention. It is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. An exothermic reaction composition, comprising
a solid reactant, wherein the solid reactant is calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, aluminum alloy, magnesium-iron, a mixture of metal oxide with at least one other solid reactant, or combinations thereof;
at least one phase change material;
a pH modulator, where the pH modulator is citric acid, tartaric acid, oxalic acid, orthophosphoric acid, sulfamic acid, sodium hydrogen sulfate, or potassium hydrogen sulfate;
wherein the reactants are encapsulated in a coating of the pH modulator; and
at least one surfactant, wherein the surfactant is ammonium lauryl sulfate, sodium dodecyl sulfate, sodium myreth sulfate, dioctyl sodium sulfosuccinate, perfluorooctanesulfonate, perfluorobutanesulfonate, alkyl benzene sulfonate, alkyl aryl ether phosphate, alkyl ether phosphate, sodium stearate, Sodium lauroyl sarcosinate, perfluorononanoate, perfluorooctanoate, octenidine dihydrochloride, alkyltrimethylammonium salt, cetyl trimethylammonium bromide, cetyl trimethylammonium chloride, cetylpyridinium chloride, polyethoxylated tallow amine, benzalkonium chloride, benzethonium chloride, 5-bromo-5-nitro-1,3-dioxane, dimethyldioctadecylammonium chloride, dioctadecyldimethylammonium bromide, 3-[(3-Cholamidopropyl)dimethylammonio]-1-propanesulfonate, cocamidopropyl hydroxysultaine, cetyl alcohol, stearyl alcohol, cetostearyl alcohol, oleyl alcohol, polyoxyethylene glycol alkyl ethers, octaethylene glycol monododecyl ether, pentaethylene glycol monododecyl ether; polyoxypropylene glycol alkyl ether; decyl glucoside, lauryl glucoside, octyl glucoside, 4-(1,1,3,3-Tetramethylbutyl)phenyl-polyethylene glycol, olyoxyethylene glycol alkylphenol ether nonoxynol-9, glyceryl laurate, nonyl phenoxypolyethoxylethanol, sorbitan alkyl ester, cocamide MEA, cocamide DEA; dodecyldimethylamine oxide, mono-ethylene glycol, block copolymers of polyethylene glycol, block copolymers of polypropylene glycol, triethanolamine, or combinations thereof.

2. The exothermic reaction composition of claim 1, wherein the metal oxide is calcium oxide, barium oxide, strontium oxide, sodium oxide, potassium oxide, magnesium oxide, lithium oxide, or combinations thereof.

3. The exothermic reaction composition of claim 1, further comprising water and at least one surfactant wherein the at least one surfactant is selected from the group consisting of glycerol and mono-ethylene glycol, ethylene glycol, and polyethylene glycol.

4. The exothermic reaction composition of claim 3, wherein the water-to-surfactant ratio is over 1.

5. The exothermic reaction composition of claim 4, wherein the water-to-surfactant ratio is between 3 and 10.

6. The exothermic reaction composition of claim 3, wherein the surfactant is ethylene glycol and the water-to-ethylene glycol ratio is between 0.25 and 1.5.

7. The exothermic reaction composition of claim 3, wherein the surfactant is mono-ethylene glycol or polyethylene glycol; and
wherein the water-to-surfactant ratio is between 3 and 10.

8. The exothermic reaction composition of claim 1, wherein the exothermic reaction composition forms reactant particles of different size distribution and different burn characteristics.

9. The exothermic reaction composition of claim 1, wherein the at least one phase change materials is selected from the group consisting of paraffins, non paraffins, fatty acids, and salt hydrates.

10. The exothermic reaction composition of claim 9, wherein the at least one phase change materials is lauric acid or myristic acid.

11. The exothermic reaction composition of claim 1, further comprising a solid reactant modulator, wherein the solid reactant modulator is zeolite, mineral chabazite, M41S type material, or zeolite-like mesoporous material.

12. The exothermic reaction composition of claim 11, further comprising polyethylene glycol, and wherein the polyethylene is in a zeolite/polyethylene glycol ratio of 0.5 to 5.

13. An exothermic reaction composition, comprising
a first solid reactant, wherein the first solid reactant is calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, aluminum alloy, magnesium-iron, a mixture of metal oxide with at least one other solid reactant, or combinations thereof;
a second solid reactant, wherein the second solid reactant is zeolite, mineral chabazite, M41S type material, or zeolite-like mesoporous material;
at least one phase change material; and
a pH modulator, where the pH modulator is citric acid, tartaric acid, oxalic acid, orthophosphoric acid, sulfamic acid, sodium hydrogen sulfate, or potassium hydrogen sulfate,
wherein the reactants are encapsulated in a coating of the pH modulator.

14. The exothermic reaction composition of claim 13, wherein the metal oxide is calcium oxide, barium oxide, strontium oxide, sodium oxide, potassium oxide, magnesium oxide, and lithium oxide, or combinations thereof.

15. The exothermic reaction composition of claim 13, wherein the zeolite is dehydrated or hydrated.

16. The exothermic reaction composition of claim 13, further comprising at least one surfactant, wherein the surfactant is ammonium lauryl sulfate, sodium dodecyl sulfate, sodium myreth sulfate, dioctyl sodium sulfosuccinate, perfluorooctanesulfonate, perfluorobutanesulfonate, alkyl benzene sulfonate, alkyl aryl ether phosphate, alkyl ether phosphate, sodium stearate, Sodium lauroyl sarcosinate, perfluorononanoate, perfluorooctanoate, octenidine dihydrochloride, alkyltrimethyl ammonium salt, cetyl trimethylammonium bromide, cetyl trimethylammonium chloride, cetylpyridinium chloride, polyethoxylated tallow amine, benzalkonium chloride, benzethonium chloride, 5-bromo-5-nitro-1,3-dioxane, dimethyldioctadecylammonium chloride, dioctadecyldimethylammonium bromide, 3-[(3-Cholamidopropyl)dimethylammonio]-1-propanesulfonate, cocamidopropyl hydroxysultaine, cetyl alcohol, stearyl alcohol, cetostearyl alcohol, oleyl alcohol, polyoxyethylene glycol alkyl ethers, octaethylene glycol monododecyl ether, pentaethylene glycol monododecyl ether; polyoxypropylene glycol alkyl ether; decyl glucoside, lauryl glucoside, octyl glucoside; polyethylene glycol p-(1,1,3,3-tetramethylbutyl)-phenyl ether, polyoxyethylene glycol alkylphenol ether nonoxynol-9, glyceryl laurate, nonyl phenoxypolyethoxylethanol, sorbitan alkyl ester, cocamide MEA, cocamide DEA; dodecyldimethylamine oxide, mono-ethylene glycol, block copolymers of polyethylene glycol, block copolymers of polypropylene glycol, triethanolamine, or combinations thereof.

17. The exothermic reaction composition of claim 13, further comprising water and at least one surfactant wherein the at least one surfactant is selected from the group consisting of glycerol and mono-ethylene glycol, and polyethylene glycol.

18. The exothermic reaction composition of claim 13, wherein particles of the reactants are of different size distribution and different burn characteristics.

19. The exothermic reaction composition of claim 13, wherein the at least one phase change materials is selected from the group consisting of paraffins, non paraffins, fatty acids, and salt hydrates.

20. The exothermic reaction composition of claim 19, wherein the at least one phase change materials is lauric acid or myristic acid.

* * * * *